US009961015B2

United States Patent
Shibayama et al.

(10) Patent No.: US 9,961,015 B2
(45) Date of Patent: May 1, 2018

(54) COMPUTER SYSTEM, AND RESOURCE MANAGEMENT METHOD

(71) Applicant: Hitachi, Ltd., Tokyo (JP)

(72) Inventors: Tsukasa Shibayama, Tokyo (JP); Yukinori Sakashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 14/770,646

(22) PCT Filed: May 15, 2013

(86) PCT No.: PCT/JP2013/063530
§ 371 (c)(1),
(2) Date: Aug. 26, 2015

(87) PCT Pub. No.: WO2014/184893
PCT Pub. Date: Nov. 20, 2014

(65) Prior Publication Data
US 2016/0006668 A1 Jan. 7, 2016

(51) Int. Cl.
*H04L 12/911* (2013.01)
*H04L 29/08* (2006.01)
*G06F 3/06* (2006.01)

(52) U.S. Cl.
CPC ............ *H04L 47/82* (2013.01); *G06F 3/0605* (2013.01); *G06F 3/067* (2013.01); *G06F 3/0631* (2013.01); *H04L 47/78* (2013.01); *H04L 47/822* (2013.01); *H04L 67/1097* (2013.01)

(58) Field of Classification Search
CPC ...... G06F 3/067; G06F 3/0631; G06F 3/0605; H04L 47/82; H04L 47/822; H04L 67/1097; H04L 47/78
See application file for complete search history.

(56) References Cited

U.S. PATENT DOCUMENTS

| | | | | |
|---|---|---|---|---|
| 7,143,116 B2 * | 11/2006 | Okitsu | ................. | G06F 3/0608 |
| 8,671,407 B2 * | 3/2014 | Ballani | ................. | H04L 67/101 |
| | | | | 718/1 |
| 9,158,940 B1 * | 10/2015 | Suit | ................. | G06F 3/067 |
| 9,244,742 B2 * | 1/2016 | Gulati | ................. | H04L 47/805 |

(Continued)

FOREIGN PATENT DOCUMENTS

JP 2010-122814 A 6/2010

OTHER PUBLICATIONS

International Search Report of PCT/JP2013/063530.

*Primary Examiner* — Patrice L Winder
(74) *Attorney, Agent, or Firm* — Mattingly & Malur, PC

(57) ABSTRACT

A computer system comprises a storage system that is configured by at least one real storage apparatus that is provided with a plurality of real resources and a management system that is coupled to the storage system. The management system is configured to allocate a real resource or a virtual resource based on the real resource as a tenant resource from the at least one real storage apparatus to a tenant based on first information that includes an upper limit that is related to a real resource of each of at least one real storage apparatus that is provided with a plurality of real resources and second information that is an upper limit that is related to a real resource that is allocated as a tenant resource that is a resource that can be used by a tenant or as a resource that is a basis of the tenant resource.

9 Claims, 36 Drawing Sheets

(56) References Cited

U.S. PATENT DOCUMENTS

| | | | |
|---|---|---|---|
| 9,569,569 B1* | 2/2017 | Colon | G06F 17/5022 |
| 2006/0069665 A1* | 3/2006 | Yamakawa | H04L 67/1097 |
| 2006/0224854 A1 | 10/2006 | Nakamura | |
| 2008/0034005 A1 | 2/2008 | Satoyama et al. | |
| 2010/0125715 A1 | 5/2010 | Takamatsu et al. | |
| 2012/0066179 A1* | 3/2012 | Saika | G06F 3/067 |
| | | | 707/634 |
| 2012/0230223 A1* | 9/2012 | Taguchi | H04L 12/4641 |
| | | | 370/254 |
| 2012/0263191 A1* | 10/2012 | Baron | H04L 67/1097 |
| | | | 370/462 |
| 2012/0272237 A1* | 10/2012 | Baron | G06F 9/45558 |
| | | | 718/1 |
| 2013/0132769 A1* | 5/2013 | Kulkarni | G06F 11/2094 |
| | | | 714/6.22 |

* cited by examiner

User account management table (2327)

| User ID (2327A) | RPU ID (2327B) | Authority (2327C) | Password (2327D) |
|---|---|---|---|
| VDKC1.ADMIN | PDKC1.RPU#01 | STORAGE ADMIN | ****** |
|  | PDKC2.RPU#01 | STORAGE ADMIN | ****** |
|  | PDKC3.RPU#01 | STORAGE ADMIN | ****** |
| VDKC2.ADMIN | PDKC1.RPU#02 | STORAGE ADMIN | ****** |
|  | PDKC2.RPU#02 | STORAGE ADMIN | ****** |
|  | PDKC3.RPU#02 | STORAGE ADMIN | ****** |
| PDKC1.ADMIN1 | PDKC1.RPU#00 | STORAGE ADMIN | ****** |
| PDKC2.ADMIN1 | PDKC2.RPU#00 | STORAGE ADMIN | ****** |
| DKCPOOL.ADMIN | RPU#FF (ALL_RPU) | STORAGE ADMIN | ****** |
|  |  | MODIFY VIRTUAL STORAGE | ****** |

Fig.6

RPU management table (2325)

| RPU ID (2325A) | Vendor (2325B) | Model (2325C) | S/N (2325D) | Management port IP address (2325E) | Status (2325F) |
|---|---|---|---|---|---|
| RPU#0 | DEFAULT | DEFAUL | DEFAUL | 20.174.32.1 | Active |
| RPU#0 | VENDOR1 | MODEL | 1111 | 111.11.11.1 | Active |
| RPU#0 | VENDOR1 | MODEL | 1212 | 10.20.30.40 | Active |
| RPU#0 | 0 | 0 | 0 | 0 | Inactive |
| ... | ... | ... | ... | ... | ... |
| RPU#3F | VENDOR2 | MODEL4 | 6363 | 63.63.63.63 | Active |

Fig. 7

| 2326 Resource ID management table | | | |
|---|---|---|---|
| 2326A Real resource ID | 2326B Type | 2326C RPU ID | 2326D Virtual resource ID |
| PORT#00 | PORT | RPU#00 | NULL |
| PORT#01 | PORT | RPU#01 | PORT#00 |
| PORT#02 | PORT | RPU#02 | PORT#00 |
| ... | PORT | ... | ... |
| PORT#FF | PORT | RPU#3F | PORT#FF |
| VOL#0000 | VOLUME | RPU#00 | NULL |
| VOL#0001 | VOLUME | RPU#01 | VOL#0000 |
| VOL#0002 | VOLUME | RPU#02 | VOL#0E01 |
| ... | VOLUME | ... | ... |
| VOL#FFFF | VOLUME | RPU#3F | VOL#FFFF |
| PG#0000 | PARITY GROUP | RPU#00 | NULL |
| PG#0001 | PARITY GROUP | RPU#01 | PG#0000 |
| PG#0010 | PARITY GROUP | RPU#02 | PG#0000 |
| ... | PARITY GROUP | ... | ... |
| PG#FFFF | PARITY GROUP | RPU#3F | PG#FFFF |

Fig. 8

| 2328 Storage apparatus model list | |
|---|---|
| 2328A Vendor ID | 2328B Model |
| VENDOR1 | MODEL1 |
| VENDOR1 | MODEL2 |
| VENDOR2 | MODEL1 |
| VENDOR2 | MODEL3 |

Fig. 9

Physical resource upper limit table (2330)

| Type (2330A) | Upper limit (2330B) |
|---|---|
| VOLUME | 64K |
| VOLUME SIZE | 2TB |
| VOLUME SIZE TOTAL | 4PB |
| STORAGE POOL | 1K |
| SNAPSHOT VOLUME / POOL | 1K |
| PORT | 256 |
| HOST GROUP / PORT | 256 |
| VOLUME / HOST GROUP | 2K |
| COPY PAIR | 16K |
| ... | ... |

Fig. 10

Virtual resource upper limit table 2331

| RPU ID | Type | Upper limit |
|---|---|---|
| RPU#00 | VOLUME | 32K |
| | VOLUME SIZE | 2TB |
| | VOLUME SIZE TOTAL | 400TB |
| | STORAGE POOL | 256 |
| | SNAPSHOT VOLUME / POOL | 1K |
| | PORT | 128 |
| | HOST GROUP / PORT | 256 |
| | VOLUME / HOST GROUP | 256 |
| | COPY PAIR | 256 |
| | ... | ... |
| RPU#01 | VOLUME | 10K |
| | VOLUME SIZE | 2TB |
| | VOLUME SIZE TOTAL | 200TB |
| | STORAGE POOL | 256 |
| | SNAPSHOT VOLUME / POOL | 1K |
| | PORT | 64 |
| | HOST GROUP / PORT | 256 |
| | VOLUME / HOST GROUP | 256 |
| | COPY PAIR | 256 |
| | ... | ... |
| ... | | |

Fig. 11

Physical resource table 2332

| Resource type (2332A) | Real resource ID (2332B) | Spec (such as size) (2332C) |
|---|---|---|
| VOLUME | VOL#0000 | 100GB |
| | VOL#0001 | 200GB |
| | ... | |
| PORT | PORT#00 | 8G |
| | PORT#01 | 4G |
| | ... | |
| | PORT#FF | 8G |
| Parity Group | PG#0000 | 10TB |
| | PG#0001 | 2TB |
| | ... | |
| Host Group | HG#000 | - |
| | HG#001 | - |
| | ... | |

Fig. 12

Virtual resource pool physical resource correspondence table ~3240

| RPU ID (3240A) | Resource pool ID (3240B) | Resource type (3240C) | PDKC ID (3240D) | Real resource ID (3240E) |
|---|---|---|---|---|
| RPU#00 | R_Pool#0000 | Storage Pool | PDKC#01 | SS POOL#001 |
| | | | PDKC#01 | PG#0001 |
| | | | PDKC#02 | SS POOL#001 |
| | | | PDKC#02 | PG#0001 |
| | R_Pool#0001 | Host Group | PDKC#01 | HG#000 |
| | | | PDKC#01 | HG#001 |
| | | | PDKC#02 | HG#002 |
| | R_Pool#0002 | MP | PDKC#01 | MP#01 |
| | | | PDKC#01 | MP#02 |
| | ... | | | |
| RPU#01 | R_Pool#0000 | Storage Pool | PDKC#01 | SS POOL#003 |
| | | | PDKC#02 | SS POOL#004 |
| | ... | | | |

Fig. 13

| | | Task management table | | | | | | |
|---|---|---|---|---|---|---|---|---|
| | | \multicolumn{6}{c}{Operation contents} | | |
| Task ID | Execution user ID | Processing name | Target apparatus | Target resource pool ID | Target resource ID | Spec | Execution scheduled (done) time | Execution status |
| Task#01 | ADMIN1 | VOL creation | RPU#01 | R_Pool#00 00 | PG#0000 | 100GB × 10Pieces | 8:00 | Completion |
| Task#02 | ADMIN2 | VOL creation | RPU#02 | R_Pool#00 01 | PG#0001 | 100GB × 20Pieces | 9:00 | Completion |
| Task#03 | ADMIN1 | Bus allocation | RPU#01 | - | VOL#0001 - VOL#0010, PORT#01 | - | 10:00 | Completion |
| Task#04 | ADMIN2 | Bus allocation | RPU#02 | - | VOL#0001 - VOL#0010, PORT#02 | - | 11:00 | Under execution |
| Task#05 | ADMIN1 | Snapshot creation | RPU#01 | R_Pool#00 00 | VOL#0000 | VVOL100Pieces | 10:30 | Completion |
| Task#06 | ADMIN2 | Snapshot creation | RPU#02 | R_Pool#00 01 | VOL#0002 | VVOL200Pieces | 11:30 | Un-execution |
| ... | | | | ... | | | | |

Fig. 14

| License management table | |
|---|---|
| RPU ID | License fee (for instance, capacity) |
| RPU#01 | 2000 |
| RPU#02 | 3000 |
| ... | ... |

Fig. 15

| Performance history table 3297 ||||||
|---|---|---|---|---|
| PDKC ID 3297A | Real resource ID 3297B | Type 3297C | Time 3297D | Performance value 3297E |
| PDKC#00 | PORT#00 | PORT | 7:00-8:00 | 100 |
| | | | 8:00-9:00 | 110 |
| | | | ... | ... |
| | ... | | ... | ... |
| | VOL#0000 | VOLUME | 7:00-8:00 | 1000 |
| | | | 8:00-9:00 | 1500 |
| | | | ... | ... |
| | ... | | ... | ... |
| PDKC#01 | PORT#01 | PORT | 7:00-8:00 | 100 |
| | ... | | 8:00-9:00 | 110 |
| ... | | | | |

Fig. 16

Configuration management table (3298)

| RPU ID (3298A) | Virtual PORT resource ID (3298B) | WWN (3298C) | Virtual HostGroup (3298D) | Virtual VOL resource ID (3298E) | LUN (3298F) |
|---|---|---|---|---|---|
| RPU#00 | PORT#00 | 11:22:33:44:55:66:77:88 | HG#001 | VOL#00 | 0 |
|  | PORT#00 | 11:22:33:44:55:66:77:88 | HG#001 | VOL#02 | 1 |
|  | PORT#01 | 11:22:33:44:AA:BB:CC:DD | HG#002 | VOL#05 | 2 |
|  | ... |  |  |  |  |
| RPU#01 | PORT#00 | 11:22:33:44:55:66:77:88 | HG#001 | VOL#00 | 0 |
|  | ... |  |  |  |  |
| ... |  |  |  |  |  |

Fig. 17

Performance lower limit table (3265)

| RPU ID (3265A) | Virtual resource ID (3265B) | Performance requirement (IOPS) (3265C) |
|---|---|---|
| RPU#00 | VOL#0000 | 100 |
|  | VOL#0001 | 200 |
|  | ... |  |
| RPU#01 | VOL#0000 | 200 |
|  | VOL#0001 | 300 |
|  | ... |  |
| ... |  |  |

Fig. 18

COMPUTER SYSTEM, AND RESOURCE MANAGEMENT METHOD

TECHNICAL FIELD

The present invention relates to a resource management technique for a computer system that includes a real storage apparatus that is provided with a plurality of resources.

BACKGROUND ART

For a computer system in which a plurality of real storage apparatuses are coupled to each other via a network, a volume identifier management method has been utilized in such a manner that a plurality of logical volumes of the plurality of real storage apparatuses is supplied to a host computer and a management computer as the same logical volume of one virtual storage apparatus (see Patent Literature 1 for instance).

By the above volume identifier management method, a logical volume of the virtual storage apparatus can be migrated from any real storage apparatus to any real storage apparatus in the network without stopping a volume utilization work and a volume management on the host computer.

On the other hand, in recent years, for a large scale storage aggregation environment in which a real storage apparatus is shared and used by a plurality of companies or a plurality of sections, a management method of a multi tenancy type in which an administrator is allocated to each company or each section and a real storage resource is distributed to each administrator is required as a storage management method in order to reduce a load of a storage administrator. In such an environment, a resource configuration management method for logically dividing a real storage resource to a plurality of clusters has been utilized (see Patent Literature 2).

CITATION LIST

Patent Literature

[PTL 1]
US Patent Application Laid-Open Publication No. 2008/0034005
[PTL 2]
US Patent Application Laid-Open Publication No. 2006/0224854

SUMMARY OF INVENTION

Technical Problem

By the management method of a multi tenancy type for instance, an administrator of each tenant can manage a resource while consciously thinking of only virtual storage apparatus that the administrator is in charge of for instance.

However, since a plurality of tenants share a real storage apparatus, there is a real possibility that an allocation of the resources of themselves is restricted according to an allocation of a resource by other tenant. For instance, in the case in which other tenant allocates many volumes to a real storage apparatus that has been used by the tenant when a tenant tries to allocate a volume, there is a real possibility that a volume cannot be allocated based on a restriction of the number of volumes that can be created for a real storage apparatus. Moreover, since an administrator of each tenant cannot know the usage conditions of a resource for other tenant, the administrator cannot also know in advance that an allocation of a resource has been restricted.

Solution of Problem

A computer system comprises a storage system that is configured by at least one real storage apparatus that is provided with a plurality of real resources and a management system that is coupled to the storage system. The management system is configured to allocate a real resource or a virtual resource based on the real resource as a tenant resource from the at least one real storage apparatus to a tenant based on first information that includes an upper limit that is related to a real resource of each of at least one real storage apparatus that is provided with a plurality of real resources and second information that is an upper limit that is related to a real resource that is allocated as a tenant resource that is a resource that can be used by a tenant or as a resource that is a basis of the tenant resource.

Advantageous Effects of Invention

A real resource of a real storage apparatus can be allocated to a tenant of a storage system in an appropriate manner.

BRIEF DESCRIPTION OF DRAWINGS

FIG. 6 is a configuration diagram showing a user account management table in accordance with the embodiment 1.

FIG. 7 is a configuration diagram showing an RPU management table in accordance with the embodiment 1.

FIG. 8 is a configuration diagram showing a resource ID management table in accordance with the embodiment 1.

FIG. 9 is a configuration diagram showing a storage apparatus model list in accordance with the embodiment 1.

FIG. 10 is a configuration diagram showing a physical resource upper limit table in accordance with the embodiment 1.

FIG. 11 is a configuration diagram showing a virtual resource upper limit table in accordance with the embodiment 1.

FIG. 12 is a configuration diagram showing a physical resource table in accordance with the embodiment 1.

FIG. 13 is a configuration diagram showing a virtual resource pool physical resource correspondence table in accordance with the embodiment 1.

FIG. 14 is a configuration diagram showing a task management table in accordance with the embodiment 1.

FIG. 15 is a configuration diagram showing a license management table in accordance with the embodiment 1.

FIG. 16 is a configuration diagram showing a performance history table in accordance with the embodiment 1.

FIG. 17 is a configuration diagram showing a configuration management table in accordance with the embodiment 1.

FIG. 18 is a configuration diagram showing a performance lower limit table in accordance with the embodiment 1.

DESCRIPTION OF EMBODIMENTS

Some embodiments will be described with reference to drawings in the following. Any embodiments that will be described in the following do not restrict the invention in accordance with the claims, and all of elements and all of combinations of the elements that will be described in the embodiments are not necessarily essential for the means for solving the problems of the invention.

In the following descriptions, while a wide variety of information in accordance with the present invention will be described in the expression such as "aaa table" in some cases, the information can be represented by other than the data structure such as a table. In order to indicate that the information is not depended on a data structure, the expression of "aaa table" can also be referred to as "aaa information".

In the following descriptions, the processing will be described while a "program" is handled as a subject in some cases. In the case in which the program is executed by a processor (for instance, a CPU (Central Processing Unit)), the processor executes the predetermined processing by using a storage resource (such as a memory) and/or a communication interface device (such as a port) as it decides proper. Consequently, a subject of a processing can also be a processor. The processing that is described while a program is handled as a subject can also be a processing that is executed by a controller that includes a processor. Moreover, the controller can also be a processor itself, and the controller can include a hardware circuit that executes a part or a whole of a processing that is executed by the processor as substitute for or in addition to a processor. A computer program can be installed from a program source to an apparatus. The program source can be a program distribution server or a storage medium that can be read by a computer for instance.

In the first place, a computer system in accordance with an embodiment 1 will be described below in detail.

Figure 1:
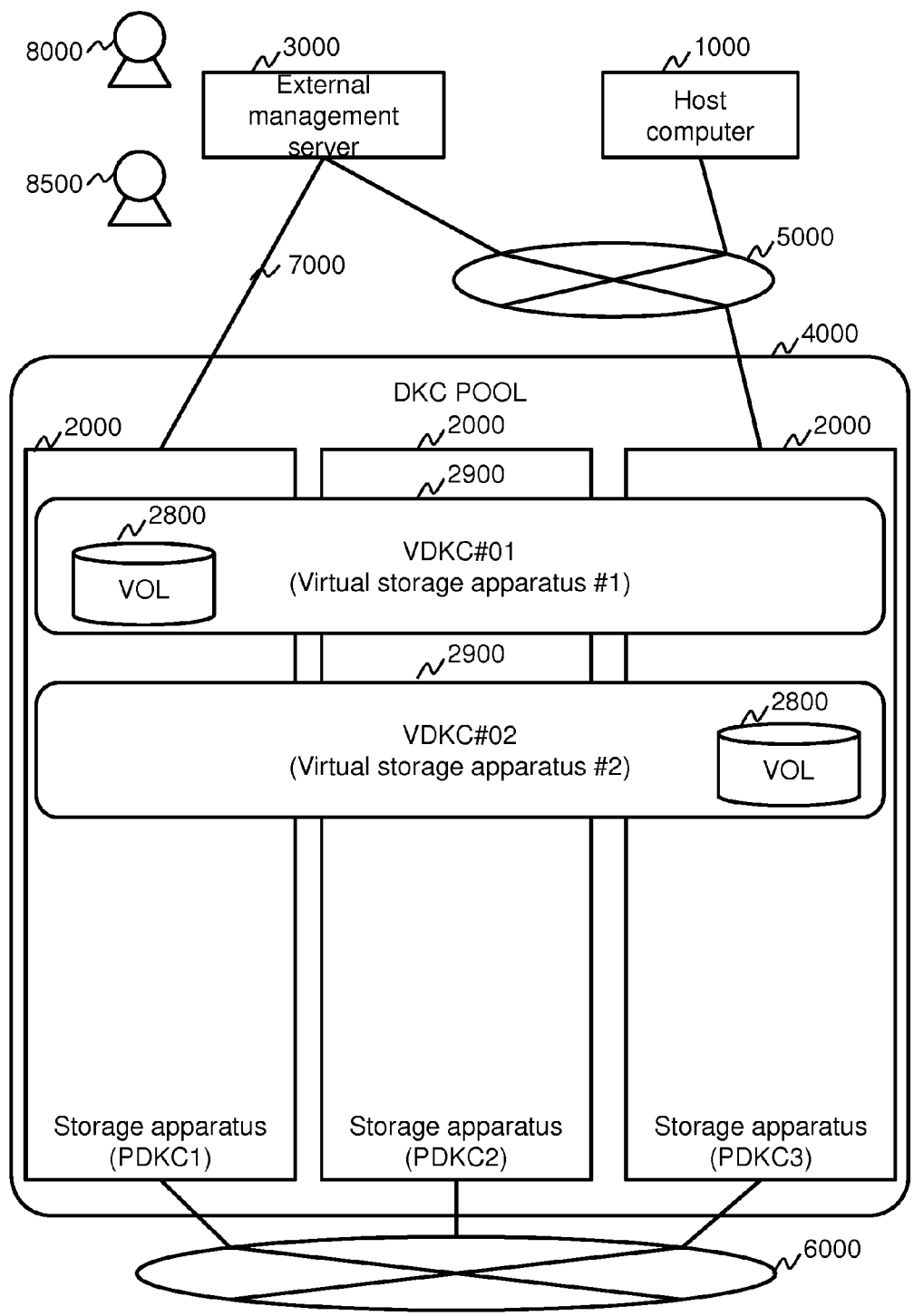
FIG. 1 is a configuration diagram showing an example of a computer system in accordance with an embodiment 1 of the present invention.

FIG. 1 is a configuration diagram showing an example of a computer system in accordance with an embodiment 1 of the present invention.

A computer system is provided with a host computer 1000, a plurality of storage apparatuses (real storage apparatuses) 2000, and an external management server 3000 for instance. The external management server 3000 and the storage apparatuses 2000 are coupled to each other via a storage network 7000. In addition, the external management server 3000, the host computer 1000, and the storage apparatuses 2000 are coupled to each other via a storage network 5000.

The plurality of storage apparatuses 2000 are coupled to each other via a backend storage network 6000. Each of the storage apparatuses 2000 can transmit an SCSI command to other storage apparatuses 2000 via a backend storage network 6000. The backend storage network 6000 and the storage network 5000 can also be the same network.

For the computer system, a DKC pool 4000 is configured by the plurality of storage apparatuses 2000. The DKC pool 4000 is within a transmission enable range of an SCSI command from the host computer 1000.

The DKC pool 4000 includes at least one RPU (RESOURCE PARTITIONING UNIT) 2900 that is located over the plurality of storage apparatuses 2000. The RPU is an example of a concept of an object that is used by a tenant, and a resource that is allocated to the RPU is an example of a resource that can be used by the tenant and that is allocated to the tenant. The RPU 2900 is configured by a plurality of resources of the plurality of storage apparatuses 2000. The RPU 2900 is supplied to the host computer 1000 and the external management server 3000 as a virtual storage apparatus (that is referred to as a virtual storage apparatus or a VDKC). The virtual storage apparatus is an example of a tenant, which is a tenant that is supplied to the host computer as a storage apparatus. On the other hand, in the case in which the virtual storage apparatus is noted as a tenant, it is not necessary that the virtual storage apparatus is supplied to the host computer as a storage apparatus and that a resource group that is allocated to the tenant is a resource configuration that is enough to configure the storage. In the present embodiment, a virtual storage apparatus will be described. However, the present resource management technology is not restricted to the virtual storage, and can be applied to a storage apparatus when it is a tenant. Moreover, a plurality of RPUs 2900 can also be configured for the DKC pool 4000. Furthermore, one virtual storage apparatus can also be configured by a plurality of RPUs 2900.

The external management server 3000 executes a wide variety of processing in accordance with an instruction from an administrator. As an administrator here for instance, there can be mentioned an administrator (a VDKC administrator) 8000 that owns only an authority of a management operation to one virtual storage apparatus and an administrator (a DKCPOOL administrator) 8500 that owns an authority of a management operation to all storage apparatuses 2000 that configure the DKC pool 4000.

Figure 2:
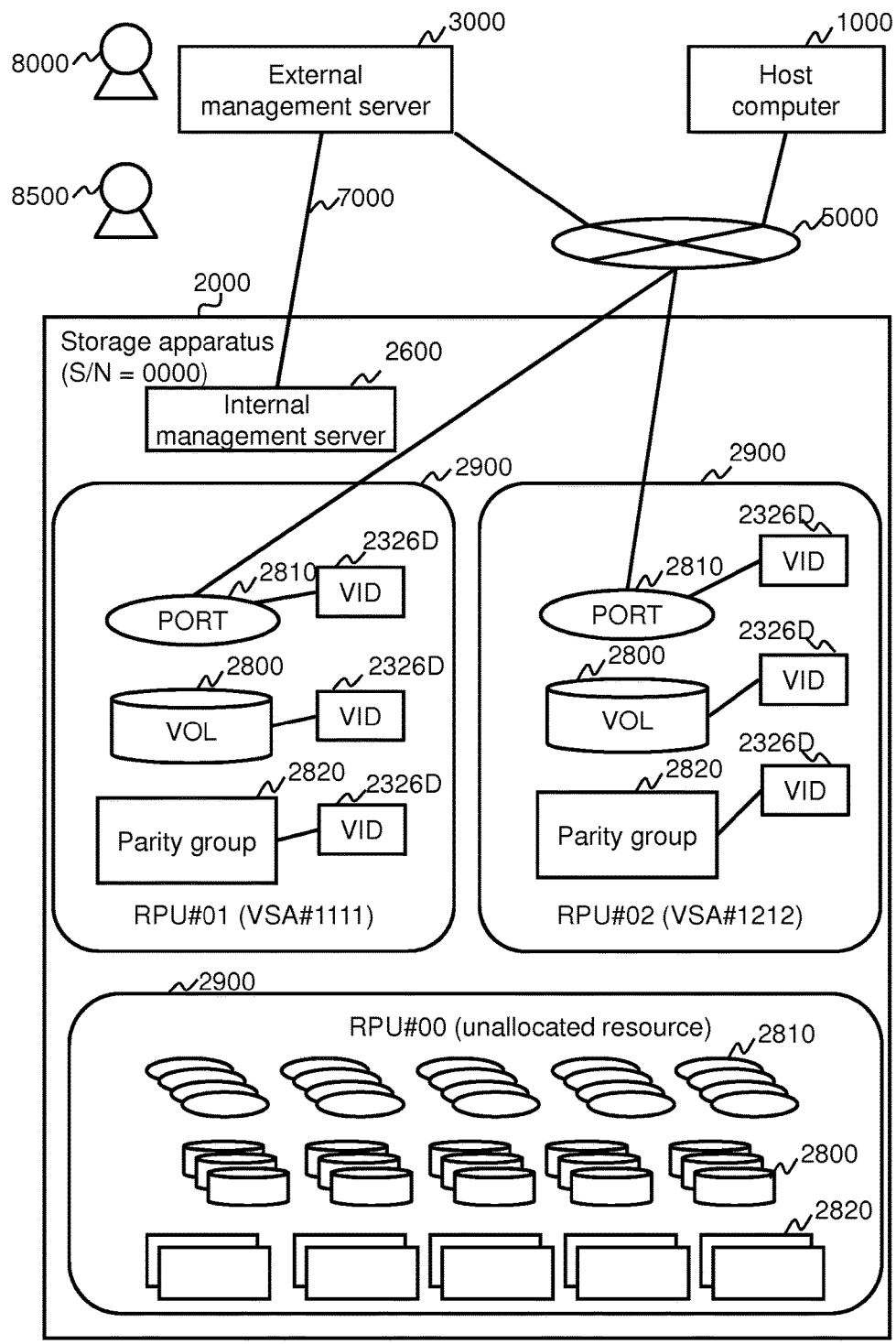
FIG. 2 is a configuration diagram showing another example of a computer system in accordance with the embodiment 1.

FIG. 2 is a configuration diagram showing another example of a computer system in accordance with the embodiment 1.

The computer system includes a host computer 1000 and one storage apparatus (real storage apparatus) 2000. The host computer 1000 and the storage apparatus 2000 are coupled to each other via a storage network 5000.

An external management server 3000 is used in the case in which administrators (users) 8000 and 8500 access the storage apparatus 2000. The external management server 3000 transmits a management command to the storage apparatus 2000 in accordance with an instruction from the administrators 8000 and 8500. In addition, the external management server 3000 controls a processing for allocating a real resource to a virtual storage apparatus (RPU 2900). At least part of the processing of the external management server 3000 can also be executed by an internal management server 2600 of any one of the storage apparatuses 2000.

The storage apparatus 2000 is provided with an internal management server 2600. The internal management server 2600 receives a management command from the external management server 3000 via the network 7000, converts the management command into an internal control command, and transmits the command to other element in the storage apparatus 2000. In addition, the internal management server 2600 executes an access control from the external management server 3000.

The storage apparatus 2000 includes a plurality of resources (real resources) and is provided with at least one RPU 2900. In an example of FIG. 2, as an RPU 2900, there are an RPU 2900 (RPU #01 and RPU #02) that includes a resource that configure a virtual storage apparatus and an RPU 2900 (RPU #00) that includes a resource that has not been allocated to a virtual storage apparatus. In the example of FIG. 2, one RPU configures one virtual storage apparatus. A real resource identifier that can identify a resource in the storage apparatus 2000 is added to each resource.

As a resource (real resource) that is included in the RPU 2900, there can be mentioned for instance a port 2810, a volume 2800, and a parity group 2820. The parity group 2820 is a RAID (Redundant Arrays of Independent Disks) group and a group of a plurality of drives that configure the RAID. The volume 2800 is a logical device (LDEV) for instance. The volume 2800 is corresponded to a part of a storage region for the storage regions that configure one parity group for instance. Other kinds of resources such as an MPPK (Micro Processor PacKage) 2200 and a CMPK (Cache Memory PacKage) 2300 that will be described later can also be included in the RPU 2900.

In the example of FIG. 2, the RPU #01 (the RPU 2900 for RPU ID=01) configures a virtual storage apparatus of a VSA #1111 and the RPU #02 (the RPU 2900 for RPU ID=02) configures a virtual storage apparatus of a VSA #1212. A virtual resource identifier (VID) 2326D is added to each resource that has been allocated to the RPU #01 and the RPU #02 as a resource of a virtual storage apparatus. A virtual resource identifier has not been added to a resource that has not been allocated to a virtual storage apparatus and that is included in the RPU #00 (the RPU 2900 for RPU ID=00).

For the computer system in accordance with the present embodiment, all resources (the port 2810, the volume 2800, and the parity group 2820 in the present example) are included in the RPU #00 in the initial state, a resource that is allocated to each RPU is moved from the RPU #00 in the case in which the RPU #01 and the RPU #02 are created after that. The volume 2800 can be created newly for the RPU #01 and the RPU #02.

For the computer system, an individual name space is defined to each virtual storage apparatus. Since each name space is independent, a virtual resource identifier that is unique in the virtual storage apparatus can be freely allocated to a resource in the RPU 2900 without a consideration of a resource identifier (a virtual resource identifier and a real resource identifier) that is used in other virtual storage apparatus and the storage apparatus 2000 in the virtual storage apparatus.

Figure 3:
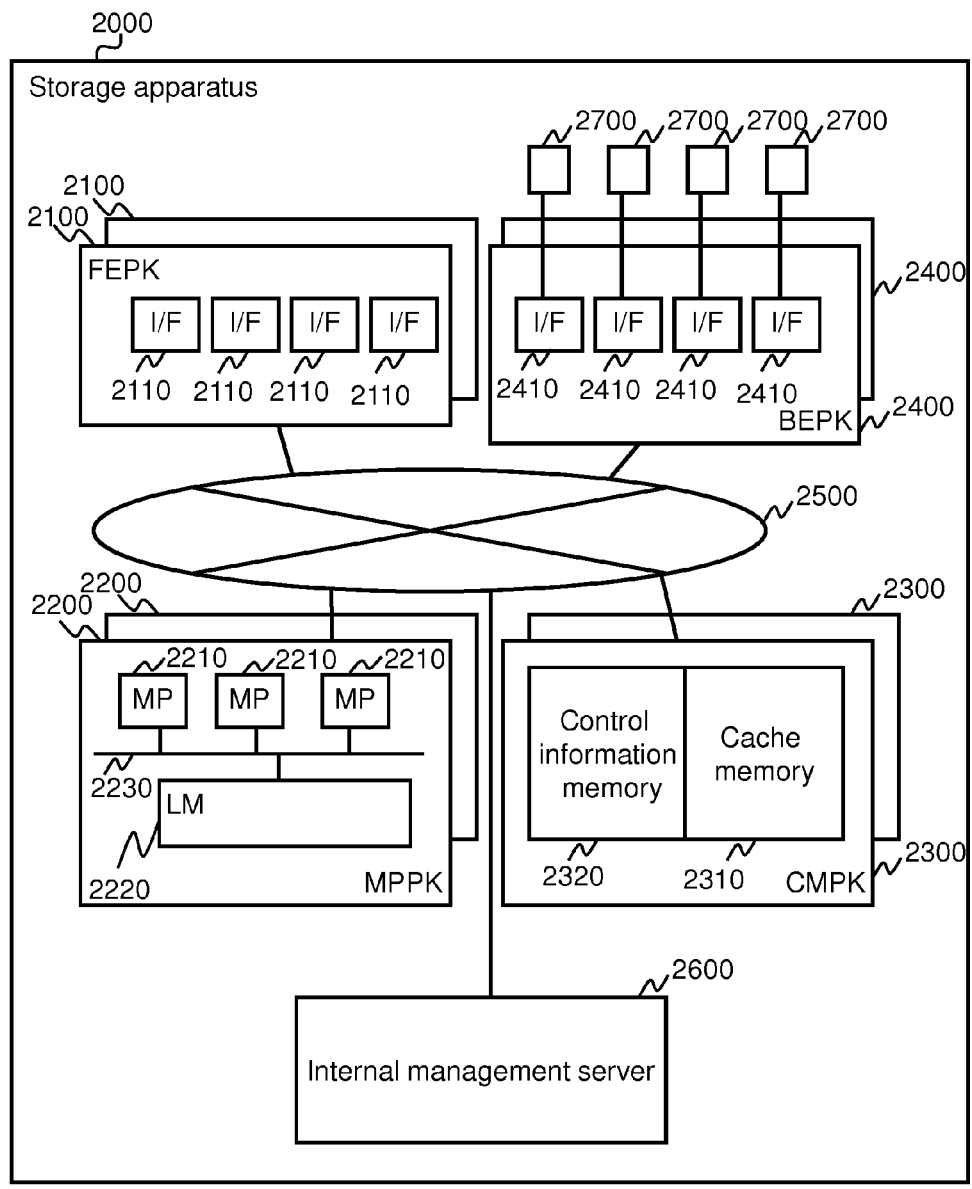
FIG. 3 is a configuration diagram showing a storage apparatus in accordance with the embodiment 1.

FIG. 3 is a configuration diagram showing a storage apparatus in accordance with the embodiment 1.

The storage apparatus 2000 includes at least one FEPK (FrontEnd PacKage) 2100, at least one MPPK 2200, at least one CMPK 2300, at least one BEPK (BackEnd PacKage) 2400, at least one HDD (hard disk drive) 2700 as an example of a storage device, an internal network 2500, and an internal management server 2600. In FIG. 3, a part of constituent elements in a package is only shown for packages such as the FEPK 2100, the MPPK 2200, the CMPK 2300, and the BEPK 2400. However, a constituent element other than the constituent elements shown in the figure can also be included.

The FEPK 2100, the MPPK 2200, the CMPK 2300, the BEPK 2400, and the management server 2600 are coupled to each other via the internal network 2500. By this configuration, each MP (Micro Processor) 2210 of the MPPK 2200 can communicate with the FEPK 2100, the CMPK 2300, the BEPK 2400, and the management server 2600 via the internal network 2500.

The FEPK 2100 is an interface device that is configured to communicate with the host computer 1000. The FEPK 2100 is provided with a plurality of host I/F 2110. The host I/F 2110 is coupled to an HBA (Host Bus Adapter) of the host computer 1000 via the network 5000, and executes a protocol control for a communication with the host computer 1000. For instance, one host I/F 2110 is corresponded to one port. Moreover, the host I/F 2110 can also be provided with a plurality of ports.

The BEPK 2400 is an interface device that is configured to communicate with the HDD 2700. The BEPK 2400 is provided with a plurality of disk I/F 2410. The disk I/F 2410 is coupled to the HDD 2700 via a cable, and is coupled to the internal network 2500 for instance. The disk I/F 2410 executes an intermediate of data of a read or write target between the internal network 2500 side and the HDD 2700.

The CMPK 2300 is provided with a data cache memory 2310 and a control information memory 2320. The data cache memory 2310 and the control information memory 2320 are a non-volatile memory or a volatile memory such as a DRAM (Dynamic Random Access Memory).

The data cache memory 2310 stores (caches) data of a write target that is to be written to the HDD 2700 on a temporary basis, and stores (caches) data of a read target that is read from the HDD 2700 on a temporary basis. The control information memory 2320 stores a program and information that are required for a processing of the storage apparatus 2000. The program and information that are stored into the control information memory 2320 will be described later.

The MPPK 2200 is provided with a plurality of MP 2210, a local memory (LM) 2220, and a bus 2230. The MP 2210 and an LM 2220 are coupled to each other via the bus 2230. The LM 2220 stores a part of the control information that has been stored into the control information memory 2320.

The management server 2600 is a computer and transfers a wide variety of information from the external management server 3000 (such as a wide variety of instructions by an administrator) to a control program that has been loaded from the control information memory 2320 to the LM 2220 and that is executed by the MP 2210. The management server 2600 can also be provided with an input device (not shown) such as a keyboard, a switch, a pointing device, and a microphone, and an output device such as a display and a speaker.

Figure 4:
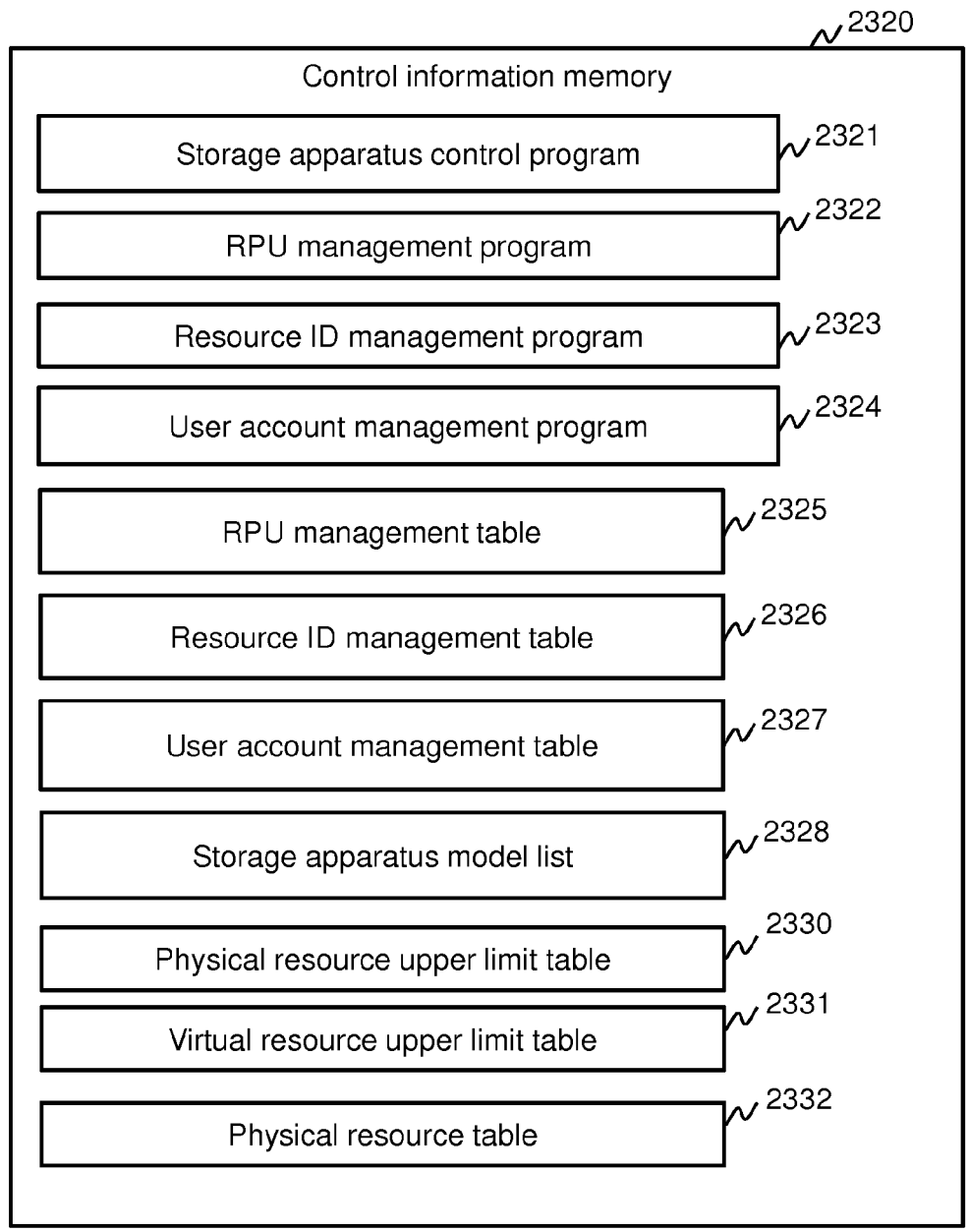
FIG. 4 is a configuration diagram showing a control information memory in accordance with the embodiment 1.

FIG. 4 is a configuration diagram showing a control information memory in accordance with the embodiment 1.

The control information memory 2320 stores a storage apparatus control program 2321, an RPU management program 2322, a resource ID management program 2323, and a user account management program 2324.

The storage apparatus control program 2321 executes a processing that is corresponded to a read request and a write request that have been received from the host computer 1000. In addition, the storage apparatus control program 2321 executes a wide variety of control processing in the storage apparatus 2000.

The RPU management program 2322 executes a management processing of an RPU in the storage apparatus 2000. The resource ID management program 2323 executes a processing for managing a real resource identifier and a virtual resource identifier that have been added to a resource of the storage apparatus 2000. The user account management program 2324 executes a processing of a user authentication and a management processing of a user account of the storage apparatus 2000 (such as a management processing of the information of an access authority of each user for instance).

The control information memory 2320 stores an RPU management table 2325, a resource ID management table 2326, a user account management table 2327, a storage apparatus model list 2328, a physical resource upper limit table 2330, a virtual resource upper limit table 2331, and a physical resource table 2332. Each table will be described later in detail.

Figure 5:
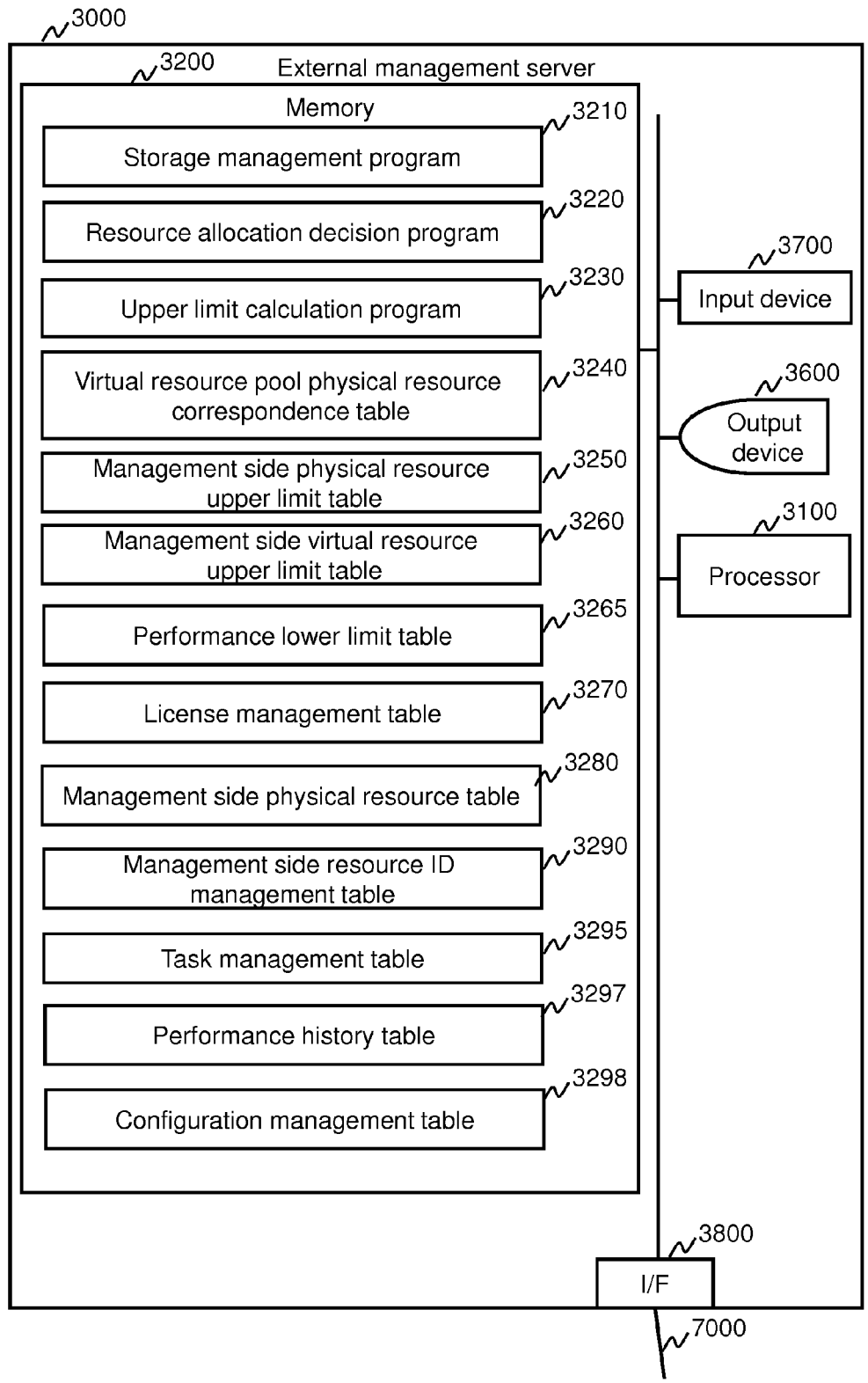
FIG. 5 is a configuration diagram showing an external management server in accordance with the embodiment 1.

FIG. 5 is a configuration diagram showing an external management server in accordance with the embodiment 1.

The external management server 3000 is configured by computers such as a personal computer, a workstation, and a mainframe, and is provided with a processor 3100, a memory 3200, an input device 3700, an output device 3600, and an I/F 3800. The processor 3100, the memory 3200, the input device 3700, the output device 3600, and the I/F 3800 are coupled to each other via an internal bus.

The input device 3700 is configured by a keyboard, a switch, and a pointing device for instance, and receives an input from a user. The output device 3600 is configured by a display and a speaker, and outputs a wide variety of information to a user. The I/F 3800 is an interface device that is configured to communicate with the storage apparatus 2000.

The processor 3100 executes an integrated control for the entire of the external management server 3000. The processor 3100 executes a wide variety of processing by executing a program that has been stored into the memory 3200. The memory 3200 stores a storage management program 3210, a resource allocation decision program 3220, and an upper limit calculation program 3230. The processing by each program will be described later in detail. In addition, the memory 3200 stores a virtual resource pool physical resource correspondence table 3240, a management side physical resource upper limit table 3250, a management side virtual resource upper limit table 3260, a performance lower limit table 3265, a license management table 3270, a management side physical resource table 3280, a management side resource ID management table 3290, a task management table 3295, a performance history table 3297, and a configuration management table 3298.

The management side physical resource upper limit table 3250 is a table in which the physical resource upper limit tables 2330 of each of the storage apparatuses 2000 are aggregated. The management side physical resource upper limit table 3250 can be configured as one table, and can also be configured in such a manner that the physical resource upper limit table 2330 of each of the storage apparatuses 2000 is included.

The management side virtual resource upper limit table 3260 is a table in which the virtual resource upper limit tables 2331 of each of the storage apparatuses 2000 are aggregated. The management side virtual resource upper limit table 3260 can be configured as one table, and can also be configured in such a manner that the virtual resource upper limit table 2331 of each of the storage apparatuses 2000 is included.

The management side physical resource table 3280 is a table in which the physical resource tables 2332 of each of the storage apparatuses 2000 are aggregated. The management side physical resource table 3280 can be configured as one table, and can also be configured in such a manner that the physical resource upper limit table 2332 of each of the storage apparatuses 2000 is included.

The management side resource ID management table 3290 is a table in which the resource ID management tables 2326 of each of the storage apparatuses 2000 are aggregated. The management side resource ID management table 3290 can be configured as one table, and can also be configured in such a manner that the resource ID management table 2326 of each of the storage apparatuses 2000 is included. The other tables will be described later in detail.

FIG. 6 is a configuration diagram showing a user account management table in accordance with the embodiment 1.

The user account management table 2327 stores an entry that is provided with a user ID field 2327A, an RPU ID field 2327B, an authority field 2327C, and a password field 2327D.

The user ID field 2327A stores a user ID of an administrator. The RPU ID field 2327B stores an ID (RPU ID) of an RPU that has been allocated to an administrator that is corresponded to a user ID. In the case in which all RPUs have been allocated to administrators, "RPU#FF" is set to the RPU ID field 2327B.

The authority field 2327C stores a type of an operation authority that has been granted to an administrator that is corresponded to a user ID.

In the case in which a type of an operation authority is "STORAGE ADMIN", an administrator that is corresponded to a user ID can execute all operations in an RPU (a virtual storage apparatus) that has been allocated. For instance, a user that is provided with this authority can execute a creation and a deletion of a volume and a control of a copy pair. On the other hand, the user that is provided with this authority cannot execute a control of a physical resource of an RPU such as a creation of an RPU and a modification (an addition and a deletion) of a physical resource of an RPU and a modification of a specification of a virtual storage apparatus. Here, a physical resource of an RPU is a port and a parity group.

In the case in which a type of an operation authority is "MODIFY VIRTUAL STORAGE", an administrator that is corresponded to a user ID can execute a creation and a modification of a virtual storage apparatus. A user that is provided with this authority can execute a creation of a new RPU, a modification of a physical resource of an RPU (a resource allocation), an allocation of an RPU by defining a new virtual storage apparatus, and a modification of a specification of a virtual storage apparatus. A modification of a physical resource of an RPU means a movement of a physical resource between RPUs. Consequently, in order to modify a physical resource of one RPU, it is necessary that a user is also provided with an authority of "MODIFY VIRTUAL STORAGE" to other RPU. A kind and the contents of an operation authority are not restricted to an example shown in FIG. 6, and an authority that is different from those can also be defined.

The password field 2327D stores a password of an administrator that is corresponded to a user ID.

From the user account management table 2327 shown in FIG. 6, it can be found that an administrator of "VDKC1.ADMIN" (such as an administrator 8000 in FIG. 1) is provided with an authority of "STORAGE ADMIN" to PDKC1.RPU #01, PDKC2.RPU #01, and PDKC3.RPU #01 for instance. Moreover, it can be found that an administrator of "DKCPOOL.ADMIN" (such as an administrator 8500 in FIG. 1) is provided with an operation authority of "STORAGE ADMIN" and "MODIFY VIRTUAL STORAGE" to all RPUs (RPU #FF) for instance.

The user account management program 2324 registers a user account for the user account management table 2327 in accordance with an instruction from the external management server 3000. More specifically, the internal management server 2600 receives the instructions of an addition, a modification, a deletion and so on of a user account together with the information of the registered contents from the external management server 3000, and transmits the data to the user account management program 2324 that has been activated. The user account management program 2324 updates the user account management table 2327 in accordance with an instruction that has been transmitted.

As described above, the internal management server 2600 controls an access from a user in accordance with the information of the user account management table 2327. For instance, the internal management server 2600 receives a user ID and a password that is used for a login from the external management server 3000, and transmits the user ID and the password to the user account management program 2324.

The user account management program 2324 compares the user ID and the password with the information of the user account management table 2327, and conforms whether or not the user ID has been registered to the user account management table 2327. In the case in which the user ID has been registered, the user account management program 2324 transmits an authentication result of that the user ID has been registered and the authority information of the user of the user ID to the internal management server 2600. In the case in which the user ID has not been registered, the user account management program 2324 transmits an authentication result of that the user ID has not been registered to the internal management server 2600.

In the case in which a user who is trying to execute a login has not been registered, the internal management server 2600 returns a login error to the external management server 3000. On the other hand, in the case in which the user has been registered, the internal management server 2600 processes a management command of the user from the external management server 3000 after that within the operation authority of the user. More specifically, the internal management server 2600 restricts a management operation range of the user to a resource in an RPU that has been allocated to the user, and restricts an operation that can be executed to an operation that is permitted within an authority that has been allocated.

For instance, the internal management server 2600 denies a request of a volume operation (a creation and a deletion of a volume and a pair creation) for a virtual storage apparatus of an RPU that has not been allocated from a user. In addition, the internal management server 2600 denies a creation request of a virtual storage apparatus and a request of a resource movement (a resource allocation) from a user that is not provided with an authority of "MODIFY VIRTUAL STORAGE".

FIG. 7 is a configuration diagram showing an RPU management table in accordance with the embodiment 1.

The RPU management table 2325 stores an entry that is provided with an RPU ID field 2325A, a vendor field 2325B, a model field 2325C, a serial number (S/N) field 2325D, a management port IP address field 2325E, and a status field 2325F. For the RPU management table 2325, in the case in which "0" is set to a value in a field, it means that a value has not allocated.

The RPU ID field 2325A stores an identifier (RPU ID) that can uniquely identify an RPU in the storage apparatus 2000. The vendor field 2325B, the model field 2325C, and the serial number (S/N) field 2325D store a virtual vendor name (a virtual identifier of a vendor), a virtual model name (a virtual identifier of a model), and a virtual serial number, respectively, for a virtual storage apparatus that is represented by the RPU (to which the RPU has been allocated).

The group of the virtual vendor name, the virtual model name, and the virtual serial number is corresponded to a virtual identifier that is unique in the storage apparatus 2000 and that is used to identify a virtual storage apparatus. In the case in which "DEFAULT" is set to the vendor field 2325B, the model field 2325C, and the serial number field 2325D, it means that a real value of the storage apparatus 2000 has been allocated to the corresponded field.

The management port IP address field 2325E stores an IP address (an access IP address) that is used for accessing the internal management server 2600 and that has been defined for an RPU management. For instance, an access IP address is masqueraded for one physical port, and one access IP address has been allocated to each virtual storage apparatus.

The status field 2325F stores a value that indicates a status of an RPU (an RPU status). In the case in which an RPU status is "active", it means that an RPU that is corresponded to an entry is representing a virtual storage apparatus, that is, the virtual storage apparatus is being operated. In this case, the storage apparatus 2000 responds a virtual identifier (including a virtual identifier of a virtual storage apparatus and a virtual resource identifier) to an identifier response request from the host computer 1000 and the external management server 3000.

In the case in which an RPU status is "inactive", it means that an RPU that is corresponded to an entry is not representing a virtual storage apparatus, that is, the virtual storage apparatus is not being operated. In this case, the storage apparatus 2000 does not respond a virtual identifier of the RPU to an identifier response request from the host computer 1000 and the external management server 3000.

FIG. 8 is a configuration diagram showing a resource ID management table in accordance with the embodiment 1.

The resource ID management table 2326 stores an entry that is provided with a real resource ID field 2326A, a type field 2326B, and an RPU ID field 2326C, and a virtual resource ID field 2326D.

The real resource ID field 2326A stores an identifier (a real resource identifier) that can uniquely identify each resource in the storage apparatus 2000 for a name space that is defined to the storage apparatus 2000.

The type field 2326B stores a type of a resource that is corresponded to an entry. In the present embodiment, as a type of a resource, there can be mentioned PORT (port), VOLUME (volume), and PARITY GROUP (parity group). Moreover, a type other than the above types can also be registered to the type field 2326B.

The RPU ID field 2326C stores an identifier (RPU ID) of an RPU to which a resource that is corresponded to an entry belongs. In the present embodiment, since all of the resources belong to any of RPUs, any of RPU ID has been stored into the RPU ID field 2326C.

The virtual resource ID field 2326D stores a virtual resource identifier that is corresponded to a resource that is corresponded to an entry. The virtual resource identifier is an identifier that can uniquely identify a resource for a name space that has been defined to an RPU. The virtual identifier (ID) indicates a virtual identifier (ID) of the virtual storage apparatus or a virtual resource identifier (ID) that is added to a resource. In the case in which "NULL" has been set to the virtual resource ID field 2326D, a virtual resource identifier has not been added to a resource that is corresponded to an entry.

In order to add a virtual resource identifier for each RPU, a name space is defined individually. Consequently, it is possible that a virtual resource identifier can be added to each resource independently from a virtual resource identifier of other RPU and a real resource identifier that is added for the storage apparatus 2000 for each RPU (a virtual storage apparatus). By this configuration, a virtual resource identifier can be freely added for each RPU, and a management for supplying a plurality of virtual storage apparatuses for the storage apparatus 2000 can be simplified.

The RPU ID is unique for the storage apparatus 2000. An identifier that is configured by a group of an RPU ID and a virtual resource identifier can uniquely identify a resource for the storage apparatus 2000 similarly to a real resource identifier. In a similar fashion, a resource can be uniquely identified for the storage apparatus 2000 by a virtual resource identifier and a virtual identifier that is configured by a group of a virtual vendor ID, a virtual model name, and a virtual serial number of the virtual storage apparatus that is represented by an RPU.

The resource ID management program 2323 manages the resource ID management table 2326. In the case in which a resource is moved between RPUs and a modification of a resource configuration (such as an addition of a virtual resource identifier) is executed, the resource ID management program 2323 updates the resource ID management table 2326 in accordance with the modification.

FIG. 9 is a configuration diagram showing a storage apparatus model list in accordance with the embodiment 1.

The storage apparatus model list 2328 stores an entry that is provided with a vendor ID field 2328A and a model field 2328B The vendor ID field 2328A stores a vendor ID of a vendor that can be represented. The model field 2328B stores a model name of a model of a virtual storage apparatus that is supplied from a vendor of a vendor ID of the vendor ID field 2328A.

An administrator can select on entry from entries of a storage apparatus model list 2328 and add a vendor name and a model name to a virtual storage apparatus that is created for the storage apparatus 2000. An RPU can represent a virtual storage apparatus that is provided with a combination of a vendor name and a model name that have been registered to the storage apparatus model list 2328.

The resource ID management program 2323 manages the storage apparatus model list 2328. For instance, the resource ID management program 2323 updates the storage apparatus model list 2328 in accordance with an instruction that has been received from the external management server 3000.

FIG. 10 is a configuration diagram showing a physical resource upper limit table in accordance with the embodiment 1.

The physical resource upper limit table 2330 stores an entry that is provided with a type field 2330A and an upper limit field 2330B.

The type field 2330A stores a type of a physical resource. The upper limit field 2330B stores an upper limit that is related to a physical resource that is corresponded to a type of a physical resource of the type field 2330A of an entry for the storage apparatus 2000 (an example of the first information). As an upper limit that is set to the upper limit field 2330B, a different type of a value can be set depending on a type of a physical resource, for instance, the number of physical resources, a performance value, or an upper limit of a capacity can also be set. For instance, in the case in which a type of a physical resource is a volume, an upper limit of the number of volumes that can be created can be set to the upper limit field 2330B. In the case in which a type of a physical resource is a PORT, an upper limit of the number of PORTs can be set to the upper limit field 2330B. In the case in which a type of a physical resource is a storage pool, an upper limit of a capacity of a storage pool can be set to the upper limit field 2330B.

FIG. 11 is a configuration diagram showing a virtual resource upper limit table in accordance with the embodiment 1.

The virtual resource upper limit table 2331 stores an entry that is provided with an RPU ID field 2331A, a type field 2331B, and an upper limit field 2331C.

The RPU ID field 2331A stores an RPU ID. The type field 2331B stores a type of a virtual resource. A type of a virtual resource is identical or similar to a type of a physical resource. The upper limit field 2331C stores an upper limit that is related to a virtual resource of a type of a type field 2331B of an entry of an RPU of an RPU ID. Since a physical resource is allocated to a virtual resource, an upper limit of a virtual resource is corresponded to an upper limit of a physical resource and is an example of the second information. As an upper limit that is set to the upper limit field 2331C, a different type of a value can be set depending on a type of a virtual resource, for instance, the number of virtual resources, a performance value, or an upper limit of a capacity can also be set. For instance, in the case in which a type of a virtual resource is a volume, an upper limit of the number of volumes that can be created can be set to the upper limit field 2331C. In the case in which a type of a virtual resource is a PORT, an upper limit of the number of PORTs can be set to the upper limit field 2331C. In the case in which a type of a virtual resource is a storage pool, an upper limit of a capacity of a storage pool can be set to the upper limit field 2331C.

FIG. 12 is a configuration diagram showing a physical resource table in accordance with the embodiment 1.

The physical resource table 2332 stores an entry that is provided with a resource type field 2332A, a real resource ID field 2332B, and a spec field 2332C.

The resource type field 2332A stores a type of a resource. The real resource ID field 2332B stores an identifier (a real resource ID) of a real resource that is corresponded to a type of a resource of the resource type field 2332A of an entry. The spec field 2332C stores a spec that is related to a real resource of the real resource ID field 2332B of an entry. For instance, a spec that is stored into the spec field 2332C is a size of a volume in the case in which a resource type is a volume. A spec that is stored into the spec field 2332C is a size of a parity group in the case in which a resource type is a parity group. A spec that is stored into the spec field 2332C is a communication speed in the case in which a resource type is a port.

FIG. 13 is a configuration diagram showing a virtual resource pool physical resource correspondence table in accordance with the embodiment 1.

The virtual resource pool physical resource correspondence table 3240 is a table that is configured to manage a resource pool that belongs to an RPU and stores an entry that is provided with an RPU ID field 3240A, a resource pool ID field 3240B, a resource type field 3240C, a PDKC ID field 3240D, and a real resource ID field 3240E.

The RPU ID field 3240A stores an RPU ID. The resource pool ID field 3240B stores an identifier (a resource pool ID) of a resource pool to which a resource for every resource type belongs for an RPU (a virtual storage apparatus) of an RPU ID of the RPU ID field 3240A. The resource type field 3240C stores a type of a resource that belongs to a resource pool of a resource pool ID of the resource pool ID field 3240B of an entry. The PDKC ID field 3240D stores an identifier (PDKC ID) of a storage apparatus (PDKC) 2000 that configures an RPU of an RPU ID of an entry. The real resource ID field 3240E stores a real resource ID of a real resource that belongs to a resource pool that is corresponded to an entry.

FIG. 14 is a configuration diagram showing a task management table in accordance with the embodiment 1.

The task management table 3295 stores an entry that is provided with a task ID field 3295A, an execution user ID field 3295B, a processing name field 3295C, a target apparatus field 3295D, a target resource pool ID field 3295E, a target resource ID field 3295F, a spec field 3295G, an execution scheduled (done) time field 3295H, and an execution status field 3295I.

The task ID field 3295A stores an identifier (a task ID) that is configured to identify a task. The execution user ID field 3295B stores an identifier (an execution user ID) of a user who executes a task of a task ID of the task ID field 3295A of an entry. The processing name field 3295C stores a processing name of the operation contents that are executed by a task of a task ID of the task ID field 3295A of an entry. The target apparatus field 3295D stores an RPU ID of a target RPU for executing an operation by a task of a task ID of the task ID field 3295A of an entry.

The target resource pool ID field 3295E stores an identifier (a resource pool ID) of a target resource pool for executing an operation by a task of a task ID of the task ID field 3295A of an entry. The target resource ID field 3295F stores an identifier (a resource ID) of a target resource for executing an operation by a task of a task ID of the task ID field 3295A of an entry. The spec field 3295G stores an operation amount to a resource that is operated by a task of a task ID of the task ID field 3295A of an entry. The execution scheduled (done) time field 3295H stores a scheduled time for executing a task of a task ID of the task ID field 3295A of an entry or a time when an execution of a task was completed. The execution status field 3295I stores an execution status of a task of a task ID of the task ID field 3295A of an entry. As an execution status that is stored into the execution status field 3295I, there can be mentioned for instance "completion" that indicates that a task has been completed, "under execution" that indicates that a task is being executed, and "un-execution" that indicates that a task has not yet been executed.

FIG. 15 is a configuration diagram showing a license management table in accordance with the embodiment 1.

The license management table 3270 stores an entry that is provided with an RPU ID field 3270A and a license fee field 3270B. The RPU ID field 3270A stores an RPU ID. The license fee field 3270B stores a license fee to an RPU of an RPU ID of the RPU ID field 3270A of an entry. As substitute for a license fee, the information such as a capacity of an RPU that can be obtained by paying a license fee can also be stored.

FIG. 16 is a configuration diagram showing a performance history table in accordance with the embodiment 1.

The performance history table 3297 is a table that is configured to manage the information of a performance value of a physical resource and stores an entry that is provided with a PDKC ID field 3297A, a real resource ID field 3297B, a type field 3297C, a time field 3297D, and a performance value field 3297E.

The PDKC ID field 3297A stores a PDKC ID of a PDKC. The real resource ID field 3297B stores a real resource ID of a real resource. The type field 3297C stores a type of a real resource that is corresponded to a resource ID of the real resource ID field 3297B of an entry. The time field 3297D stores a time when a performance value of the performance value field 3297E has been measured. The performance value field 3297E stores a performance value for a time of the time field 3297D that is corresponded to a real resource ID of the real resource ID field 3297B of an entry.

FIG. 17 is a configuration diagram showing a configuration management table in accordance with the embodiment 1.

The configuration management table 3298 stores an entry that is provided with an RPU ID field 3298A, a virtual PORT resource ID field 3298B, a WWN field 3298C, a virtual HostGroup field 3298D, a virtual VOL resource ID field 3298E, and a LUN field 3298F.

The RPU ID field 3298A stores an RPU ID of an RPU. The virtual PORT resource ID field 3298B stores a resource ID of a virtual port (a virtual PORT resource ID). The WWN field 3298C stores a WWN (World Wide Name) of a virtual port that is corresponded to a resource ID of the virtual PORT resource ID field 3298B. The virtual HostGroup field 3298D stores an identifier of a virtual host group. The virtual VOL resource ID field 3298E stores a resource ID of a virtual volume. The LUN field 3298F stores a LUN (Logical Unit Number) of a virtual port that is corresponded to a resource ID of the virtual VOL resource ID field 3298E of an entry.

FIG. 18 is a configuration diagram showing a performance lower limit table in accordance with the embodiment 1.

The performance lower limit table 3265 stores an entry that is provided with an RPU ID field 3265A, a virtual resource ID field 3265B, and a performance requirement field 3265C.

The RPU ID field 3265A stores an RPU ID of an RPU. The virtual resource ID field 3265B stores a resource ID of a virtual resource (a virtual resource ID) for an RPU that is corresponded to the RPU ID field 3265A of an entry. The performance requirement field 3265C stores a performance requirement to a virtual resource of a resource ID of the virtual resource ID field 3265B for an RPU of an RPU ID of the RPU ID field 3265A of an entry, that is, the lower limit of a performance that is required. As a performance requirement, the lower limit of an IOPS (Input Output Per Second) that is requested to a volume is stored in the case in which a virtual resource is a volume for instance. In the performance lower limit table 3265 shown in FIG. 18, an example for managing a performance requirement to a volume is illustrated. However, a performance requirement to a port, a storage apparatus, or an application can also be managed.

A processing operation for a computer system in accordance with the first embodiment will be described in the next place.

In the first place, a VDKC upper limit setting processing will be described. The VDKC upper limit setting processing is executed by the external management server 3000 after a VDKC is newly set to a computer system for instance. As a VDKC upper limit setting processing, there can be mentioned for instance a VDKC upper limit setting processing for setting an upper limit that is related to a virtual resource for a VDKC based on the information of a license fee to a VDKC (see FIG. 19) and a VDKC upper limit setting processing for setting an upper limit that is related to other virtual resource for a VDKC based on a Pool capacity that has been allocated to a VDKC (see FIG. 20).

Figure 19:
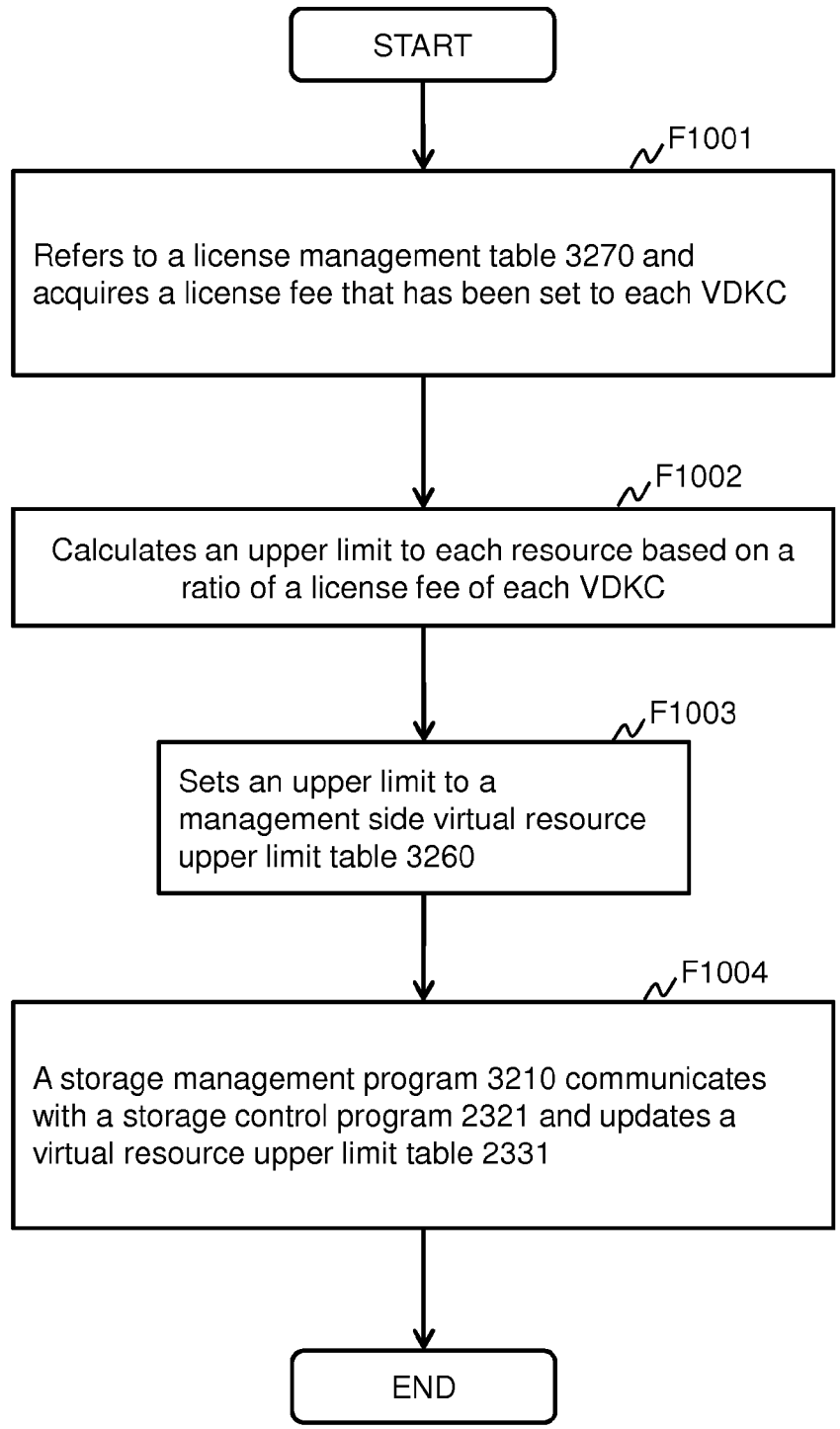
FIG. 19 is a flowchart showing a first example of a VDKC upper limit setting processing in accordance with the embodiment 1.

FIG. 19 is a flowchart showing a first example of a VDKC upper limit setting processing in accordance with the embodiment 1.

A VDKC upper limit setting processing shown in FIG. 19 is a processing for creating and setting an upper limit that is related to a virtual resource for a VDKC based on the information of a license fee to a VDKC.

An upper limit calculation program 3230 of the external management server 3000 refers to a license management table 3270 and acquires the information of a license fee that is corresponded to each VDKC (RPU) (step F1001).

In the next place, the upper limit calculation program 3230 calculates an upper limit to each resource of each VDKC for each PDKC based on a ratio of a license fee of each VDKC (step F1002). For instance, in the case in which an RPU #01 and an RPU #02 exist for each PDKC and a ratio of a license fee of these is 2:1, a calculation is executed in such a manner that a ratio of an upper limit of a resource to the RPU #01 and an upper limit of a resource to the RPU #02 becomes a ratio of a license fee for an upper limit of each virtual resource. More specifically, the total sum of Pool capacity of each PDKC is calculated in such a manner that a ratio of an upper limit of a resource to the RPU #01 and an upper limit of a resource to the RPU #02 becomes a ratio of a license fee for an upper limit of a Pool capacity of each VDKC for each PDKC.

A ratio of an upper limit of a resource of each VDKC can also become a ratio of a license fee for virtual resources of all kinds. Moreover, an upper limit of part of kinds of virtual resources can be constant regardless of a ratio of a license fee. More specifically, an upper limit of a size of a volume of each VDKC can be constant and an upper limit of the number of volumes can be a ratio of a license fee for instance. Moreover, an upper limit of a size of a volume of each VDKC can be a ratio of a license fee and an upper limit of the number of volumes can be constant. Moreover, a ratio of an upper limit of a resource of each VDKC is not a ratio of a license fee and can be a ratio that is calculated based on a ratio of a license fee.

In the next place, the upper limit calculation program 3230 sets an upper limit of each resource that has been calculated to an entry that is corresponded to each resource of a management side virtual resource upper limit table 3260 (step F1003).

In the next place, a storage management program 3210 communicates with a storage control program 2321 of the internal management server 2600, and updates an upper limit that is corresponded to each resource of a virtual resource upper limit table 2331 (step F1004). By this configuration, an upper limit of a resource that has been calculated is set to a virtual resource upper limit table 2331 of each storage apparatus 2000.

Figure 20:
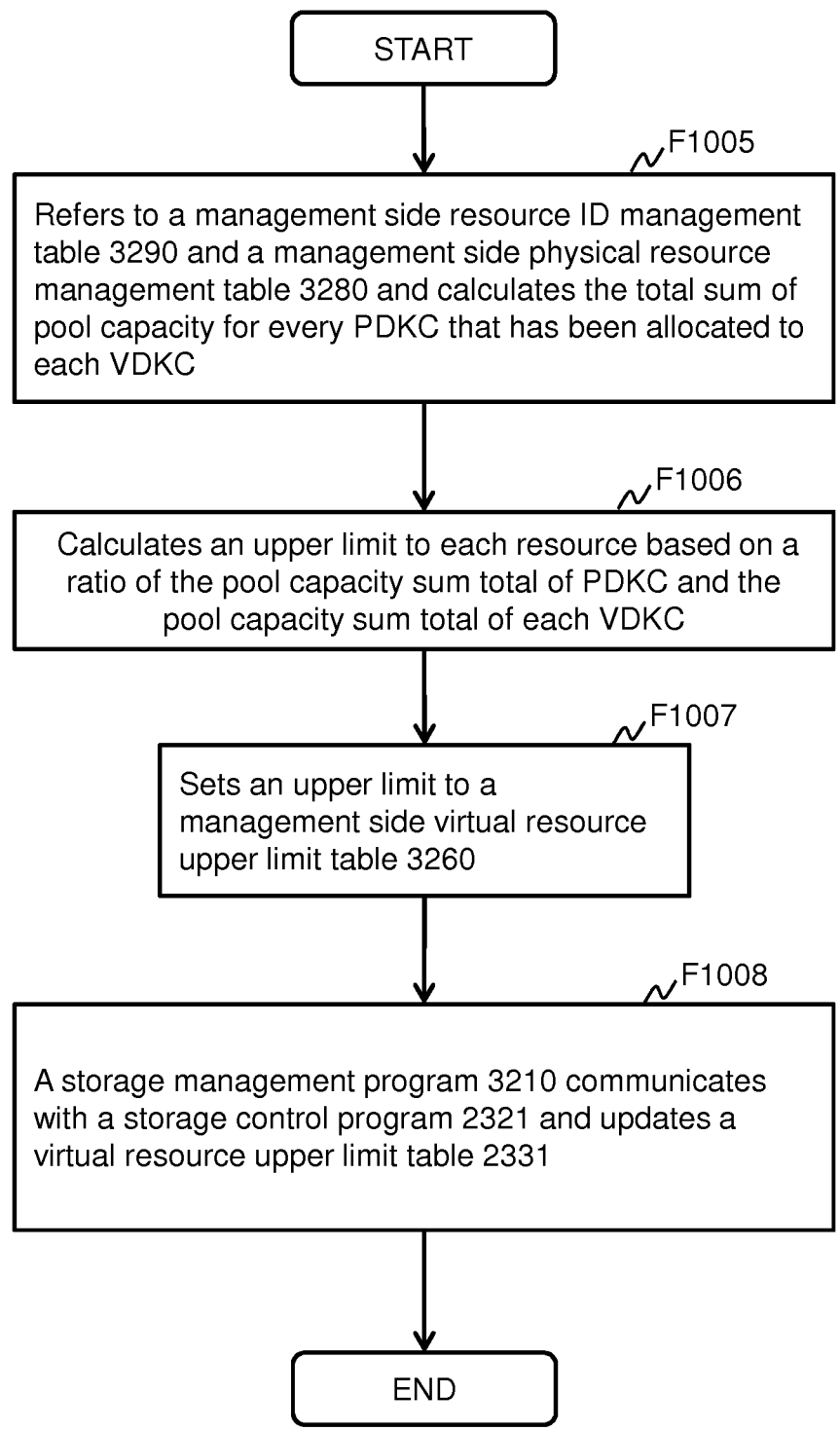
FIG. 20 is a flowchart showing a second example of a VDKC upper limit setting processing in accordance with the embodiment 1.

FIG. 20 is a flowchart showing a second example of a VDKC upper limit setting processing in accordance with the embodiment 1.

A VDKC upper limit setting processing shown in FIG. 20 is a processing for creating and setting an upper limit that is related to other virtual resource for a VDKC based on the a Pool capacity that has been allocated to a VDKC.

An upper limit calculation program 3230 of the external management server 3000 refers to a management side resource ID management table 3290 and a management side physical resource management table 3280 and calculates the total sum of Pool capacity (a Pool capacity sum total) for every PDKC that has been allocated to each VDKC (RPU) (step F1005). More specifically, the upper limit calculation program 3230 identifies a real resource ID of a Pool that has been allocated to each VDKC by each PDKC by referring to the management side resource ID management table 3290, identifies a Pool capacity that is corresponded to a real resource ID by referring to the management side physical resource management table 3280 using the real resource ID, and sums up the Pool capacity for every PDKC for every capacity of each VDKC.

In the next place, the upper limit calculation program 3230 calculates an upper limit to each resource of each VDKC for each PDKC based on a ratio of the Pool capacity sum total of each PDKC and the Pool capacity sum total that has been allocated to each VDKC for each VDKC (step F1006). For instance, in the case in which an RPU #01 and an RPU #02 exist for a certain PDKC and a ratio of a Pool capacity sum total of each RPU for the PDKC is 2:1, a calculation is executed in such a manner that a ratio of an upper limit of a resource to the RPU #01 and an upper limit of a resource to the RPU #02 becomes a ratio of a Pool capacity sum total of each RPU for an upper limit of each virtual resource for each the PDKC.

A ratio of an upper limit of a resource of each VDKC can also become a ratio of the Pool capacity sum total of each RPU for each PDKC. Moreover, an upper limit of part of kinds of virtual resources can be constant regardless of a ratio of the Pool capacity sum total of each RPU. More specifically, an upper limit of a size of a volume of each VDKC can be constant and an upper limit of the number of volumes can be a ratio of the Pool capacity sum total of each RPU for instance. Moreover, an upper limit of a size of a volume of each VDKC can be a ratio of the Pool capacity sum total of each RPU and an upper limit of the number of volumes can be constant. Moreover, a ratio of an upper limit of a resource of each VDKC is not a ratio of the Pool capacity sum total of each RPU and can be a ratio that is calculated based on a ratio of the Pool capacity sum total of each RPU for each PDKC.

In the next place, the upper limit calculation program 3230 sets an upper limit of each resource that has been calculated to an entry that is corresponded to each resource of a management side virtual resource upper limit table 3260 (step F1007).

In the next place, a storage management program 3210 communicates with a storage control program 2321, and updates an upper limit that is corresponded to each resource of a virtual resource upper limit table 2331 (step F1008). By this configuration, an upper limit of a resource that has been calculated is set to a virtual resource upper limit table 2331 of each storage apparatus 2000.

In the next place, a leveling setting processing will be described. The leveling setting processing is a processing for allocating a virtual resource to an RPU and is executed after the VDKC upper limit setting processing is terminated.

Figure 21:
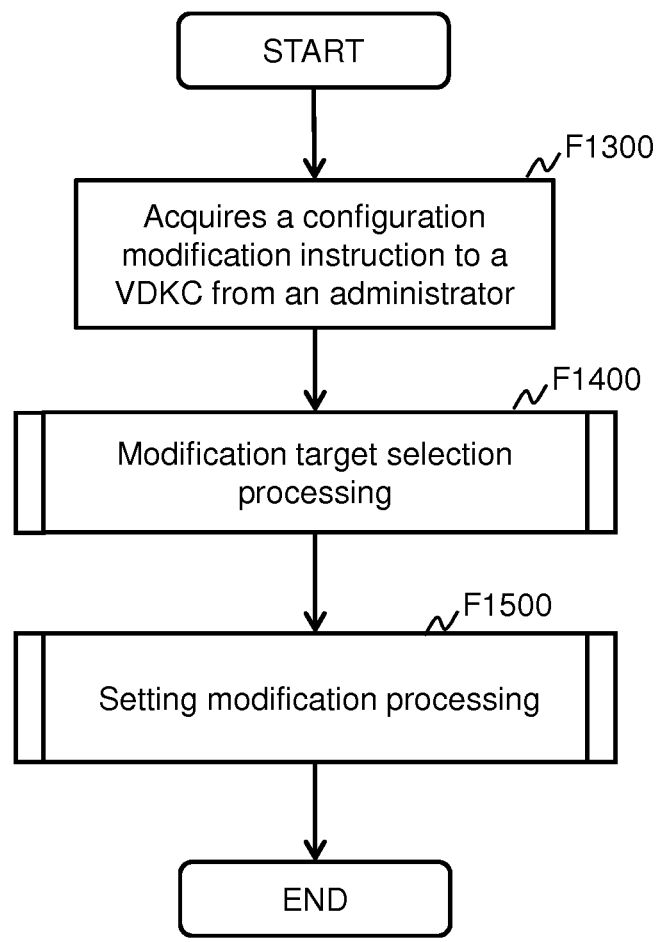
FIG. 21 is a flowchart showing a leveling setting processing in accordance with the embodiment 1.

FIG. 21 is a flowchart showing a leveling setting processing in accordance with the embodiment 1.

In the case in which a storage management program 3210 of the external management server 3000 receives a configuration modification instruction to a VDKC from an administrator (step F1300), the storage management program 3210 starts an execution of a modification target selection processing (see FIG. 22 and FIG. 23) (step F1400). In the case in which the modification target selection processing is executed, a target PDKC that executes a modification of a resource is selected. The configuration modification instruction includes the information for identifying a target VDKC that modifies a virtual resource and the information for identifying a target virtual resource that is modified.

In the next place, the resource allocation decision program 3220 instructs an execution of a setting modification processing (see FIG. 24 and FIG. 25) to the RPU management program 2322 (step F1500). In this case, the resource allocation decision program 3220 transmits a processing result by the modification target selection processing (such as an RPU ID of an RPU of an allocation target, a resource ID of a resource of an allocation target, and a virtual resource ID to the resource) to the RPU management program 2322. By this setting modification processing, a configuration modification to a VDKC is executed. After the setting modification processing is terminated, a result of a configuration modification to a VDKC is notified of to an administrator via the external management server 3000.

Figure 22:
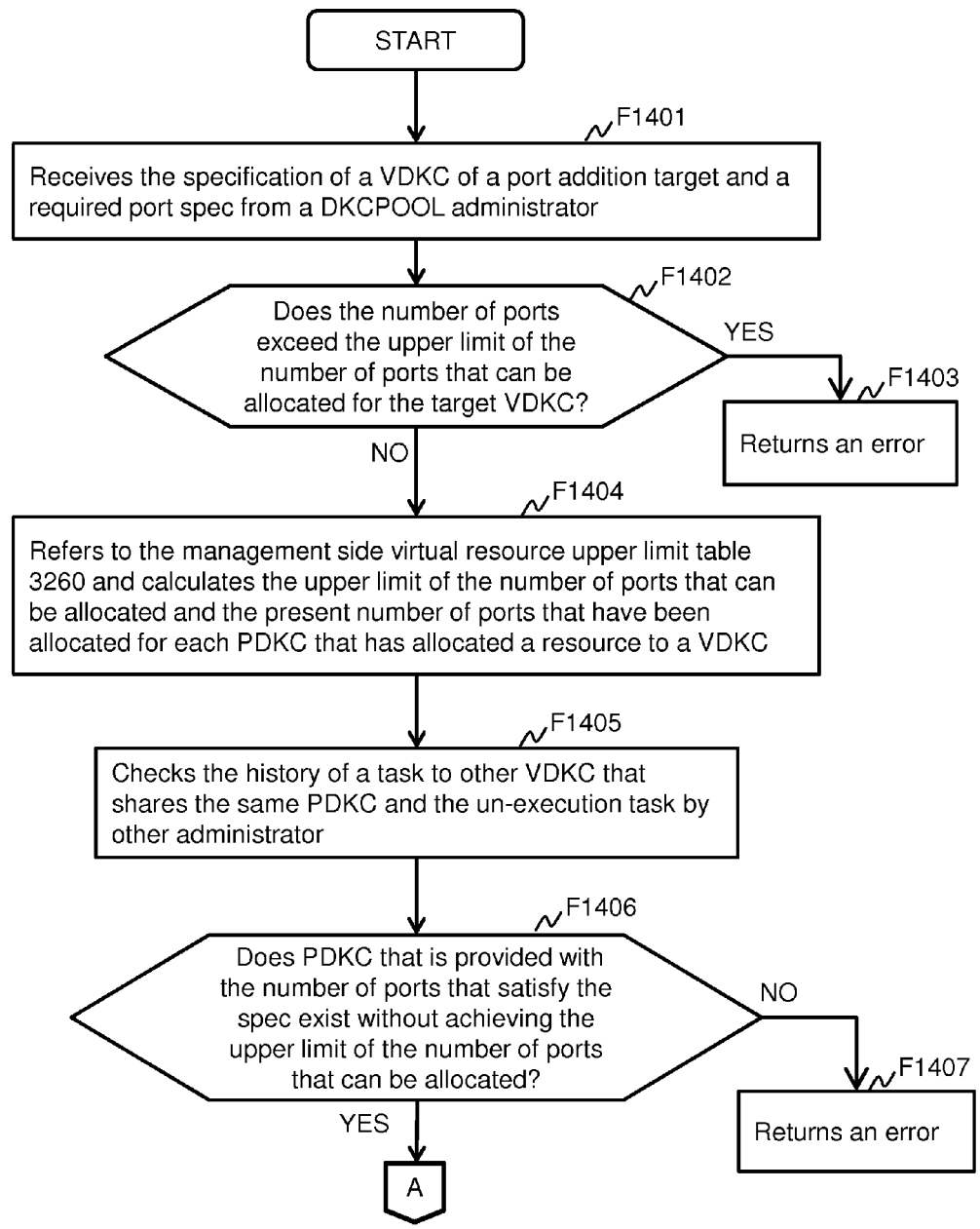
FIG. 22 is a first flowchart showing a modification target selection processing in accordance with the embodiment 1.
Figure 23:
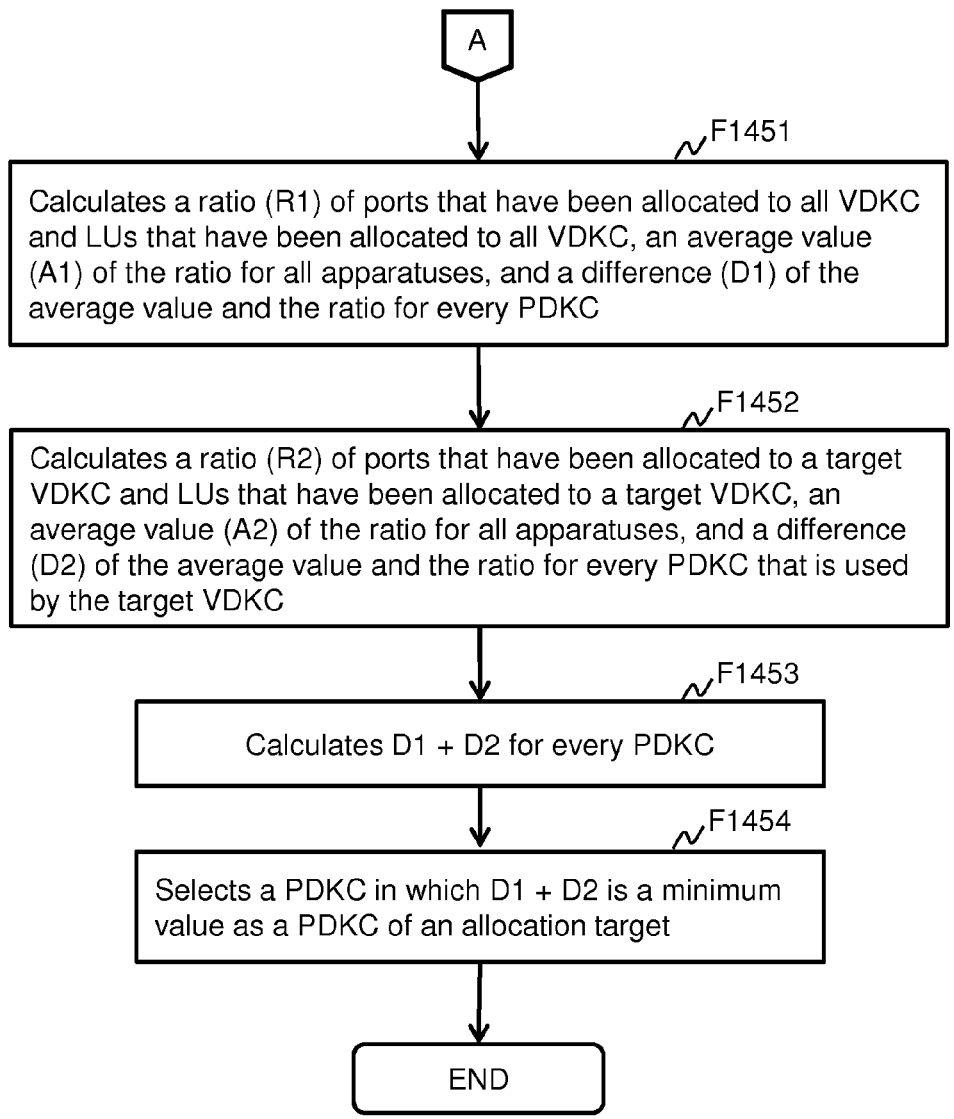
FIG. 23 is a second flowchart showing a modification target selection processing in accordance with the embodiment 1.

FIG. 22 is a first flowchart showing a modification target selection processing in accordance with the embodiment 1. FIG. 23 is a second flowchart showing a modification target selection processing in accordance with the embodiment 1.

A symbol A of the flowchart of FIG. 22 and a symbol A of the flowchart of FIG. 23 indicate that the flowcharts are coupled to each other.

The modification target selection processing is corresponded to a processing of the step F1400 of the leveling setting processing of FIG. 21. FIG. 22 and FIG. 23 illustrate the modification target selection processing in the case in which a modification in which a port is added to a VDKC is executed.

The storage management program 3210 receives a VDKC of a port addition target and a required port spec (such as a communication speed of a port) that have been specified by a DKCPOOL administrator (step F1401). A VDKC of a port addition target and a required port spec are included in a configuration modification instruction of the step F1300.

In the next place, the resource allocation decision program 3220 refers to the management side virtual resource upper limit table 3260 and judges whether or not the number of ports that are required for satisfying the spec of the port that has been received by the storage management program 3210 exceeds the upper limit of the number of ports that can be allocated for the VDKC (step F1402). As a result, in the case in which the number of ports that are required for satisfying the spec of the port that has been received exceeds the upper limit of the number of ports that can be allocated for the VDKC (step F1402: YES), the resource allocation decision program 3220 returns an error and terminates the processing (step F1403).

On the other hand, in the case in which the number of ports that are required for satisfying the spec of the port that has been received does not exceed the upper limit of the number of ports that can be allocated for the VDKC (step F1402: NO), the resource allocation decision program 3220 refers to the management side virtual resource upper limit table 3260 and calculates the upper limit of the number of ports that can be allocated for each PDKC that has allocated a resource to a target VDKC. In addition, the resource allocation decision program 3220 refers to management side resource ID management table 3290 and calculates the present number of ports that have been allocated (step F1404).

In the next place, the resource allocation decision program 3220 refers to the task management table 3295 and checks the history of a processing (a task) to other VDKC that shares the same PDKC and the un-execution task (step F1405). More specifically, the resource allocation decision program 3220 knows the number of allocated ports for a task to other VDKC that shares the same PDKC and the number of ports that will be allocated by the un-execution task for each PDKC.

In the next place, the resource allocation decision program 3220 judges whether or not a PDKC that is provided with the number of ports that satisfy the spec that has been received exists without achieving the upper limit of the number of ports that can be allocated in consideration of the number of ports that have been allocated by other task and the number of ports that will be allocated by other task (step F1406).

As a result, in the case in which such a PDKC does not exist (step F1406: NO), the resource allocation decision program 3220 returns an error and terminates the processing (step F1407).

On the other hand, in the case in which such a PDKC exists (step F1406: YES), the resource allocation decision program 3220 calculates a ratio (R1) of ports that have been allocated to all VDKC and LUs that have been allocated to all VDKC for every PDKC, an average value (A1) of the ratio (R1) of ports that have been allocated to all VDKC and LUs that have been allocated to all VDKC, and a difference (D1) of the average value (A1) and the ratio (R1) of ports and LUs for every PDKC (step F1451). Here, as D1 is smaller, the ratio (R1) of ports and LUs is larger for the PDKC. In other words, it indicates that the bandwidth capacity of a port has been left. Consequently, in the case in which a PDKC to which a port is allocated is selected based on D1, a load for a port that is allocated from each PDKC can be leveled.

In the next place, the resource allocation decision program 3220 calculates a ratio (R2) of ports that have been allocated to a target VDKC for every PDKC that has been allocated to a target VDKC and LUs that have been allocated to target VDKC, an average value (A2) of the ratio (R2) of ports for all PDKC and LUs for all PDKC, and a difference (D2) of the average value (A2) and the ratio (R2) of ports and LUs for every PDKC (step F1452). Here, as D2 is smaller, the ratio (R2) of ports and LUs is larger for the PDKC for a target VDKC. In other words, it indicates that the bandwidth capacity of a port for the PDKC has been left for a target VDKC. Consequently, in the case in which a PDKC to which a port is allocated is selected based on D2, a load for a port that is allocated from each PDKC can be leveled for a target VDKC.

In the next place, the resource allocation decision program 3220 calculates D1+D2 for every PDKC (step F1453).

In the next place, the resource allocation decision program 3220 selects a PDKC in which a value of D1+D2 is a minimum value as a PDKC of an allocation target of a port to a VDKC (step F1454), selects a port of an allocation target from the selected PDKC, decides a virtual resource ID that is allocated to the port, and terminates the processing. By this processing, a PDKC in which a value of D1+D2 is a minimum value, that is, a PDKC in which the bandwidth capacity of a port has been left and the bandwidth capacity of a port for a target VDKC has been left can be selected in an appropriate manner. By this configuration, a load of a port between PDKCs can be leveled and a load of a port between PDKCs for, a target VDKC can be leveled.

Figure 24:
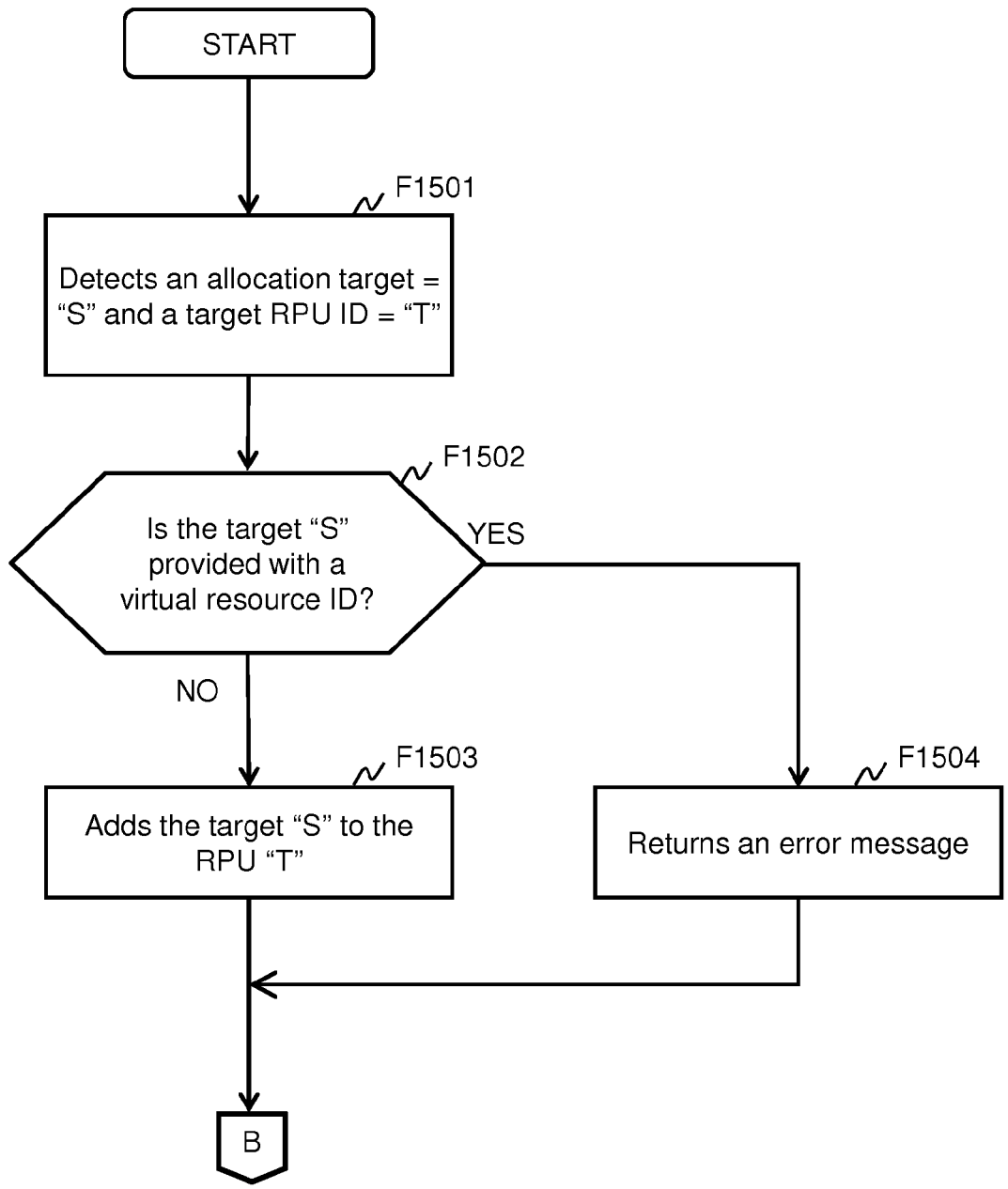
FIG. 24 is a first flowchart showing a setting modification processing in accordance with the embodiment 1.
Figure 25:
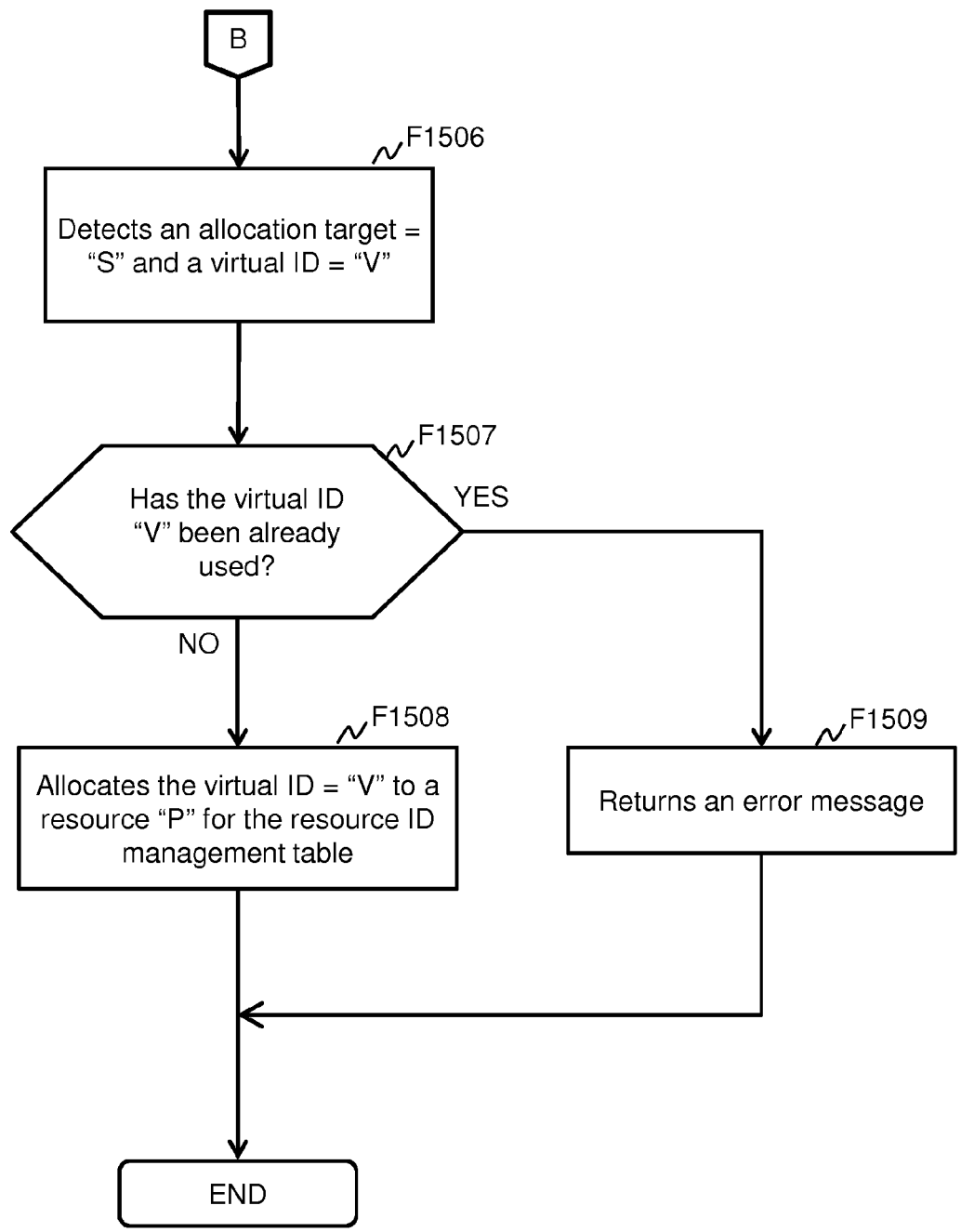
FIG. 25 is a second flowchart showing a setting modification processing in accordance with the embodiment 1.

FIG. 24 is a first flowchart showing a setting modification processing in accordance with the embodiment 1. FIG. 25 is a second flowchart showing a setting modification processing in accordance with the embodiment 1. A symbol B of the flowchart of FIG. 24 and a symbol B of the flowchart of FIG. 25 indicate that the flowcharts are coupled to each other. The modification target selection processing is corresponded to a processing of the step F1500 of the leveling setting processing of FIG. 21.

The RPU management program 2322 acquires a real resource ID of a resource of an allocation target and an RPU ID of an RPU of an allocation target from a processing result of the modification target selection processing (step F1501). In the description of the processing of this flowchart, a real resource ID of a resource of an allocation target is represented by "S" and an RPU ID of an RPU of an allocation target is represented by "T".

In the next place, the RPU management program 2322 searches an entry in which a value of the real resource ID field 2326A is "S" for the resource ID management table 2326, and judges whether or not a virtual resource ID has been registered to the virtual resource ID field 2326D of this entry (step F1502).

As a result, in the case in which a virtual resource ID has been registered to the virtual resource ID field 2326D of the entry (step F1502: YES), it is indicated that a virtual resource ID has already been added to a resource of a real resource ID "S", and the RPU management program 2322 returns an error message to an administrator via the internal management server 2600 or the storage apparatus control program 2321 (step F1504) and makes the processing proceed to the step F1506.

On the other hand, in the case in which a virtual resource ID has not been registered to the virtual resource ID field 2326D of the entry (step F1502: NO), it is indicated that a virtual resource ID has not been added to a resource of a real resource ID "S", and the RPU management program 2322 sets a value of the RPU ID field 2326C to "T" for an entry in which a value of the real resource ID field 2326A is "S" of the resource ID management table 2326 (step F1503) and makes the processing proceed to the step F1506.

In the step F1506, the RPU management program 2322 acquires a real resource ID of a real resource ID of a resource to which a virtual resource ID is added and a virtual resource ID from a processing result of the modification target selection processing. In the descriptions of the following steps of this flowchart, a real resource ID of a resource of an allocation target of a virtual resource ID is represented by "P" and a virtual resource ID that is to be allocated is represented by "V".

The RPU management program 2322 refers to the resource ID management table 2326, identifies an entry of the acquired real resource ID "P", and acquires an RPU ID of an RPU to which a real resource belongs from the RPU ID field 2326C of the entry. The RPU management program 2322 judges whether or not a group of the acquired RPU ID and the acquired virtual resource ID "V" has already been registered to the resource ID management table 2326 (step F1507). More specifically, the RPU management program 2322 judges whether or not a group of the RPU ID and the virtual resource ID matches up with a group of values of the RPU ID field 2326C and the virtual resource ID field 2326D of any one of the entries.

As a result, in the case in which a group of the RPU ID and the virtual resource ID has already been registered (step F1507: YES), the RPU management program 2322 returns an error message that indicates that the specified virtual resource ID has already existed to a requesting person via the internal management server 2600 or the storage apparatus control program 2321 (step F1509) and terminates the setting modification processing. By this configuration, the same virtual resource IDs can be prevented from overlapping for the VDKC.

On the other hand, in the case in which a group of the RPU ID and the virtual resource ID has not been registered (step F1507: NO), the RPU management program 2322 stores a virtual resource ID "V" into the virtual resource ID field 2326D for an entry in which a value of the real resource ID field 2326A is "P" of the resource ID management table 2326 (step F1508) and terminates the setting modification processing. By this configuration, a real resource of an allocation target can be identified by the virtual resource ID in the VDKC.

A computer system in accordance with the embodiment 2 will be described in the next place.

The computer system in accordance with the embodiment 2 executes a processing for allocating an LU as a resource from a Pool that has already been allocated to an RPU. The configuration of the computer system in accordance with the embodiment 2 is basically equivalent to that of the computer system in accordance with the embodiment 1. In the following, the points that are different from the computer system in accordance with the embodiment 1 will be described mainly.

A processing operation for the computer system in accordance with the embodiment 2 will be described in the next place.

Figure 26:
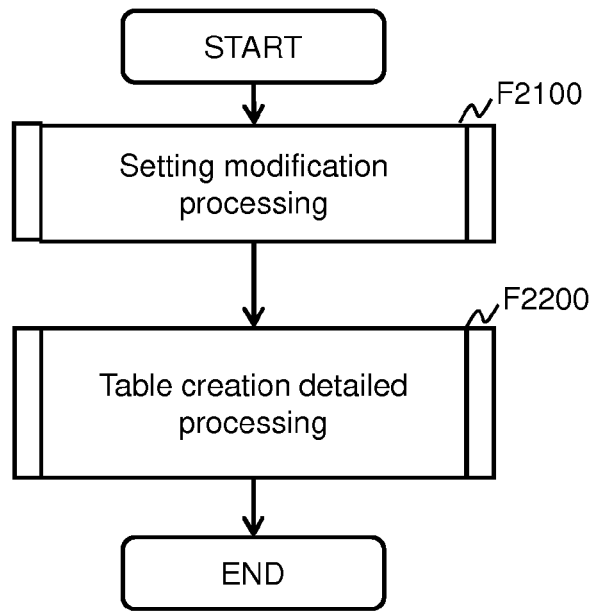
FIG. 26 is a flowchart showing a virtual resource pool physical resource correspondence table creation processing in accordance with an embodiment 2.

FIG. 26 is a flowchart showing a virtual resource pool physical resource correspondence table creation processing in accordance with an embodiment 2.

A virtual resource pool physical resource correspondence table creation processing is executed before a leveling setting processing that is described later.

In the first place, the resource allocation decision program 3220 starts an execution of the setting modification processing (a processing identical or similar to that of FIG. 24 and FIG. 25) (step F2100). For the setting modification processing in accordance with an embodiment 2, in the steps F1501 and F1506, a real resource ID of a resource of an allocation target, an RPU ID of an RPU of an allocation target, and a virtual resource ID are acquired from a configuration modification instruction that is transmitted from the external management server 3000 by a DKCPOOL administrator.

In the next place, the storage management program 3210 starts an execution of a table creation detailed processing (see FIG. 28) (step F2200) and terminates the virtual resource pool physical resource correspondence table creation processing after the termination of table creation detailed processing.

Figure 28:
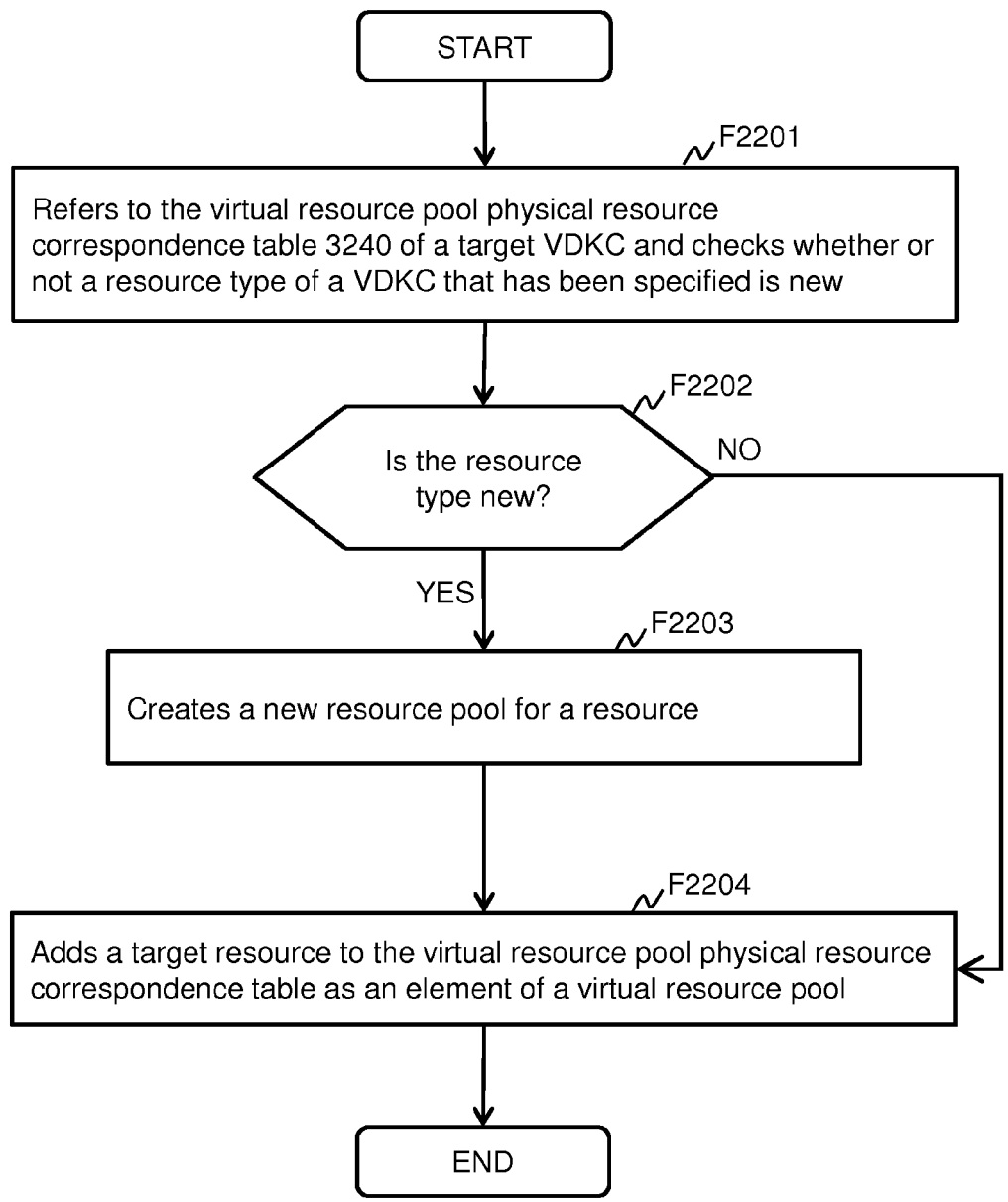
FIG. 28 is a flowchart showing a table creation detailed processing in accordance with the embodiment 2.

FIG. 28 is a flowchart showing a table creation detailed processing in accordance with the embodiment 2.

The table creation detailed processing is corresponded to a processing of the step F2200 of FIG. 26.

The storage management program 3210 refers to the virtual resource pool physical resource correspondence table 3240, checks whether or not a resource type of a resource that has been added is new for a VDKC to which a resource has been added (step F2201), and judges whether or not a resource type of a resource that has been added to a VDKC is new (step F2202).

As a result, in the case in which the resource type is new (step F2202: YES), the storage management program 3210 creates a new virtual resource pool for this resource (step F2203) and makes the processing proceed to the step F2204. More specifically, the storage management program 3210 decides a virtual resource pool ID of a new virtual resource pool. On the other hand, in the case in which the resource type is not new (step F2202: NO), the storage management program 3210 makes the processing proceed to the step F2204.

In the step F2204, the storage management program 3210 adds a resource that has been added to the virtual resource pool physical resource correspondence table 3240 as an element of a virtual resource pool that is corresponded to a resource type of the resource. More specifically, the storage management program 3210 adds an entry that includes a real resource ID of a resource that has been added, an DKC ID of a PDKC to which the resource belongs, a resource type of the resource, a resource pool ID of a virtual resource pool to which the resource of the resource type belongs, and an RPU ID of an RPU to which the resource has been added to the virtual resource pool physical resource correspondence table 3240.

In the next place, a leveling setting processing in accordance with the embodiment 2 will be described.

Figure 27:
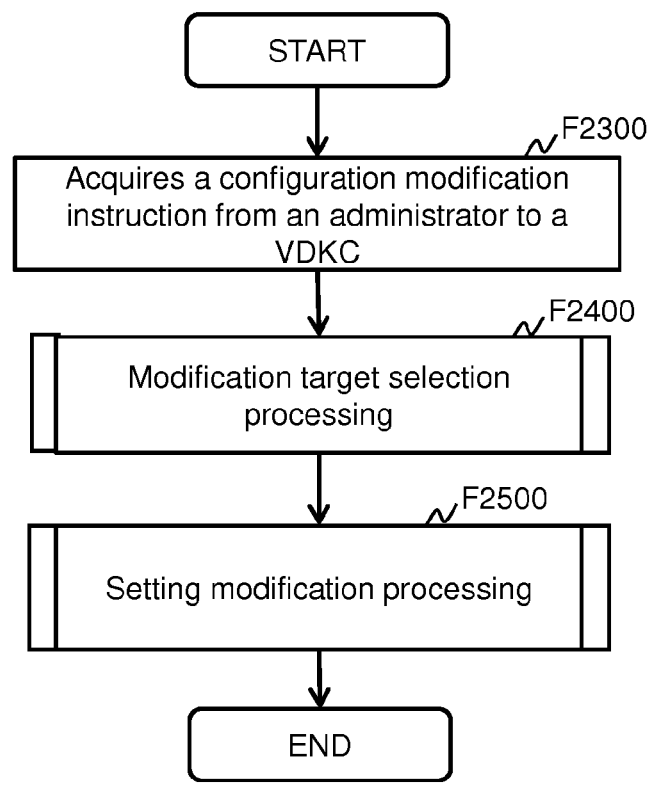
FIG. 27 is a flowchart showing a leveling setting processing in accordance with the embodiment 2.

FIG. 27 is a flowchart showing a leveling setting processing in accordance with the embodiment 2.

In the case in which a storage management program 3210 of the external management server 3000 receives a configuration modification instruction to a VDKC from an administrator (step F2300), the storage management program 3210 starts an execution of a modification target selection processing (see FIG. 29 to FIG. 31) (step F2400). In the case in which the modification target selection processing is executed, a Pool and a target PDKC that executes a modification of a resource are selected. The configuration modification instruction includes the information for identifying a target VDKC that add an LU and the information for identifying the number of LUs to be added in the case of a configuration modification instruction for creating an LU for instance.

In the first place, the resource allocation decision program 3220 starts an execution of the setting modification processing (see FIG. 32) (step F2500). By this setting modification processing, a configuration modification to a VDKC is executed. After the setting modification processing is terminated, a result of a configuration modification to a VDKC is notified of to an administrator.

Figure 29:
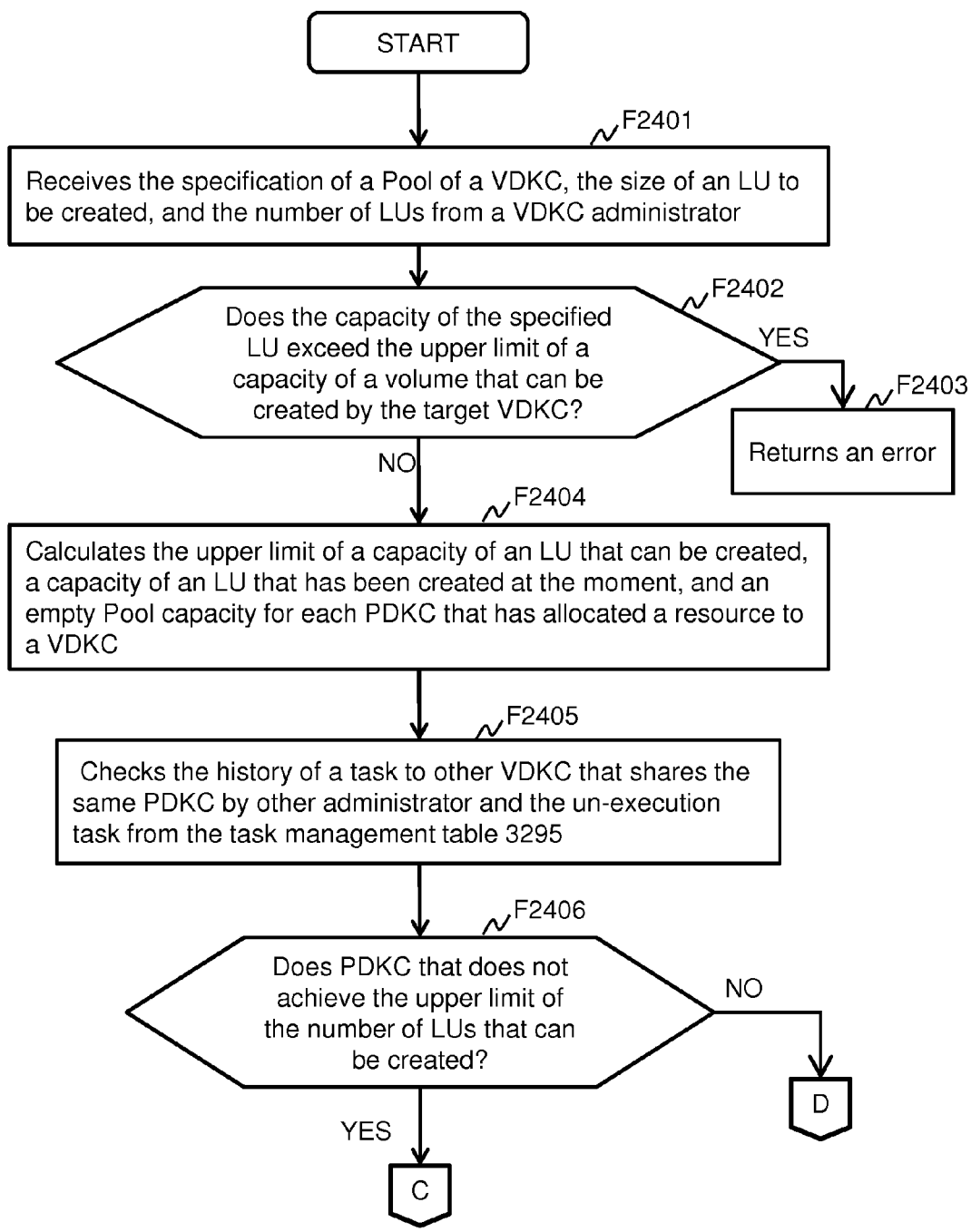
FIG. 29 is a first flowchart showing a modification target selection processing in accordance with the embodiment 2.
Figure 30:
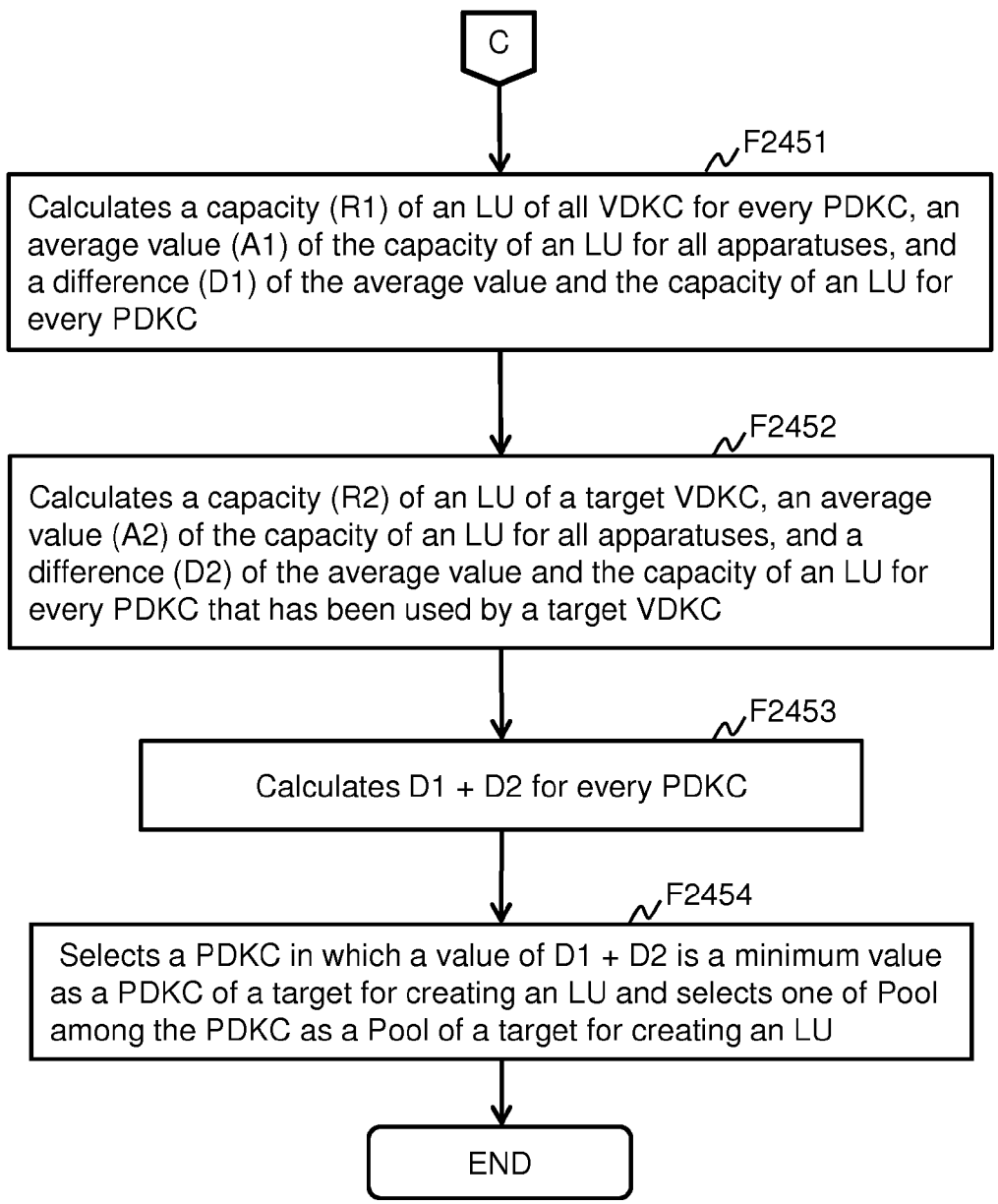
FIG. 30 is a second flowchart showing a modification target selection processing in accordance with the embodiment 2.
Figure 31:
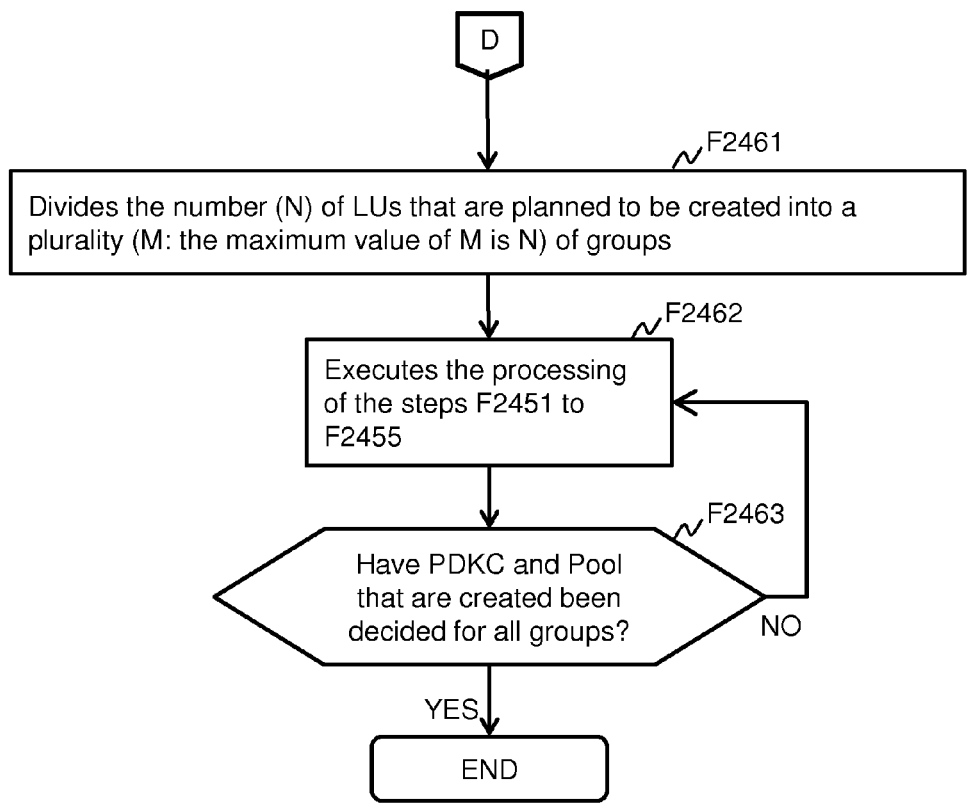
FIG. 31 is a third flowchart showing a modification target selection processing in accordance with the embodiment 2.

FIG. 29 is a first flowchart showing a modification target selection processing in accordance with the embodiment 2. FIG. 30 is a second flowchart showing a modification target selection processing in accordance with the embodiment 2. FIG. 31 is a third flowchart showing a modification target selection processing in accordance with the embodiment 2. A symbol C of the flowchart of FIG. 29 and a symbol C of the flowchart of FIG. 30 indicate that the flowcharts are coupled to each other. In addition, a symbol D of the flowchart of FIG. 29 and a symbol D of the flowchart of FIG. 31 indicate that the flowcharts are coupled to each other.

The modification target selection processing is corresponded to a processing of the step F2400 of the leveling setting processing of FIG. 27. FIG. 29 to FIG. 31 illustrate the modification target selection processing in the case in which an LU is created to a VDKC.

The storage management program 3210 receives a Pool of a VDKC for creating an LU, the size of an LU to be created, and the number of LUs from a VDKC administrator (step F2401).

In the next place, the resource allocation decision program 3220 judges whether or not the total capacity of an LU for which the storage management program 3210 receives a creation instruction exceeds the upper limit of a capacity of a volume that can be created by the specified VDKC (step F2402). As a result, in the case in which the total capacity of an LU that has been received by the storage management program 3210 exceeds the upper limit of a capacity of a volume that can be created by the VDKC (step F2402: YES), the resource allocation decision program 3220 returns an error and terminates the processing (step F2403).

On the other hand, in the case in which the total capacity of an LU that has been received by the storage management program 3210 does not exceed the upper limit of a capacity of a volume that can be created by the specified VDKC (step F2402: NO), the resource allocation decision program 3220 refers to the management side physical resource upper limit table 3250 and the management side physical resource table 3280 for each PDKC that has allocated a resource to a target VDKC, and calculates the upper limit of a capacity of an LU that can be created, a capacity of an LU that has been created at the moment, and an empty Pool capacity (step F2404).

In the next place, the resource allocation decision program 3220 refers to the task management table 3295 and checks the history of a processing (a task) to other VDKC that shares the same PDKC and the un-execution task (step F2405). More specifically, the resource allocation decision program 3220 knows the number of allocated LUs for a task to other VDKC that shares the same PDKC and the number of LUs that will be allocated by the un-execution task for each PDKC.

In the next place, the resource allocation decision program 3220 judges whether or not a PDKC that has not reached the upper limit of the total capacity of an LU that can be created exists in consideration of the number of LUs that have been allocated by other task and the number of LUs that will be allocated by other task (step F2406).

As a result, in the case in which such a PDKC does not exist (step F2406: NO), the resource allocation decision program 3220 makes the processing proceed to the step F2461 of FIG. 31.

On the other hand, in the case in which such a PDKC exists (step F2406: YES), the resource allocation decision program 3220 calculates a capacity (R1) of an LU that has been allocated to all VDKC for every PDKC, an average value (A1) of the capacity (R1) of an LU for all VDKC, and a difference (D1) of the average value (A1) and the capacity (R1) of an LU for every PDKC (step F2451). Here, as D1 is larger, the capacity (R1) of an LU that has been allocated for the PDKC is smaller. Consequently, in the case in which a PDKC to which an LU is allocated is selected based on D1, a capacity of an LU that is allocated among each PDKC can be leveled.

In the next place, the resource allocation decision program 3220 calculates a capacity (R2) of an LU that has been allocated to a VDKC for every PDKC that has been allocated to a target VDKC, an average value (A2) of the capacity (R2) of an LU of a target VDKC for all PDKC, and a difference (D2) of the average value (A2) and the capacity (R2) of an LU for every PDKC (step F2452). Here, as D2 is larger, the capacity of an LU is smaller for the PDKC for a target VDKC. Consequently, in the case in which a PDKC to which an LU is allocated is selected based on D2, a capacity of an LU can be leveled for a target VDKC.

In the next place, the resource allocation decision program 3220 calculates D1+D2 for every PDKC (step F2453).

In the next place, the resource allocation decision program 3220 selects a PDKC in which a value of D1+D2 is a minimum value as a PDKC of a target for creating an LU, selects one of Pool among the PDKC as a Pool of a target for creating an LU (step F2454), and terminates the processing.

In the next place, in the step F2461, the resource allocation decision program 3220 divides the number (N) of LUs that are planned to be created into a plurality (M: M is a number that is equal to or less than N) of groups (step F2461). In the next place, the resource allocation decision program 3220 sets one of the groups as a processing target and executes the processing of the steps F2451 to F2455.

In the next place, the resource allocation decision program 3220 judges whether or not the processing of the step F2462 has been executed to all groups that have been divided in the step F2461 (step F2463). In the case in which the processing has not been executed to all groups (step F2463: NO), the resource allocation decision program 3220 makes the processing proceed to the step F2462 and executes a processing to a group that has not yet been processed. On the other hand, in the case in which the processing has been executed to all groups (step F2463: YES), the resource allocation decision program 3220 terminates the modification target selection processing. By the processing of the steps F2461 to F2463, a PDKC of a target for creating an LU and a Pool of a target for creating an LU are selected for every group of an LU. By the above processing, a PDKC and a Pool for allocating an LU that is created can be selected in an appropriate manner.

Figure 32:
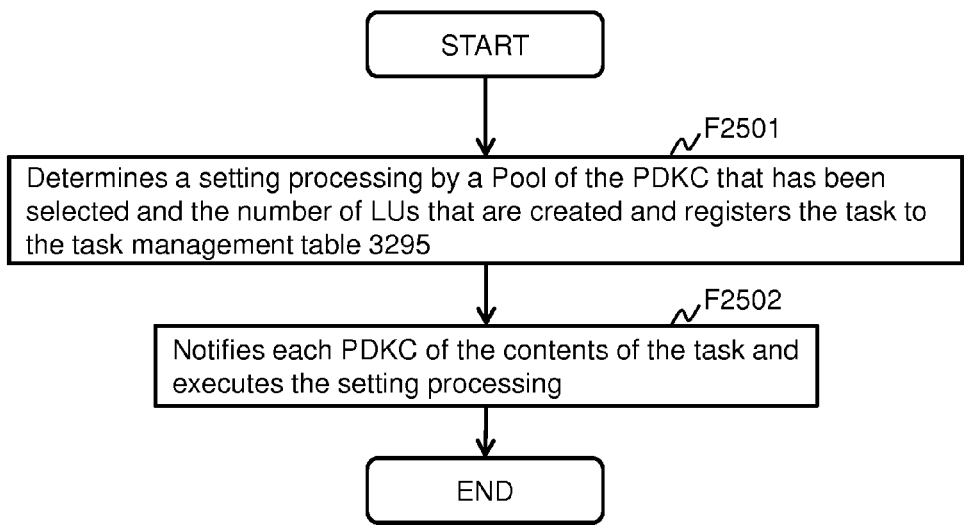
FIG. 32 is a flowchart showing a setting modification processing in accordance with the embodiment 2.

FIG. 32 is a flowchart showing a setting modification processing in accordance with the embodiment 2.

The setting modification processing is corresponded to a processing of the step F2500 of the leveling setting processing of FIG. 27.

The storage management program 3210 determines a setting processing by a Pool of the PDKC that has been selected in the modification target selection processing and the number of LUs that are created, and registers a task that is corresponded to the setting processing to the task management table 3295 (step F2501). In the next place, the storage management program 3210 notifies each PDKC of a target for creating an LU of the contents of the task, and makes the setting processing that is corresponded to the task to be executed (step F2502). By this configuration, LUs of the specified number are created in the selected Pool for each PDKC.

A computer system in accordance with the embodiment 3 will be described in the next place.

The computer system in accordance with the embodiment 3 executes a processing of an allocation of a resource in a scale out of the storage apparatus for the computer system. The configuration of the computer system in accordance with the embodiment 3 is basically equivalent to that of the computer system in accordance with the embodiment 1. In the following, the points that are different from the computer system in accordance with the embodiment 1 will be described mainly.

A processing operation for the computer system in accordance with the embodiment 3 will be described in the next, place.

Figure 33:
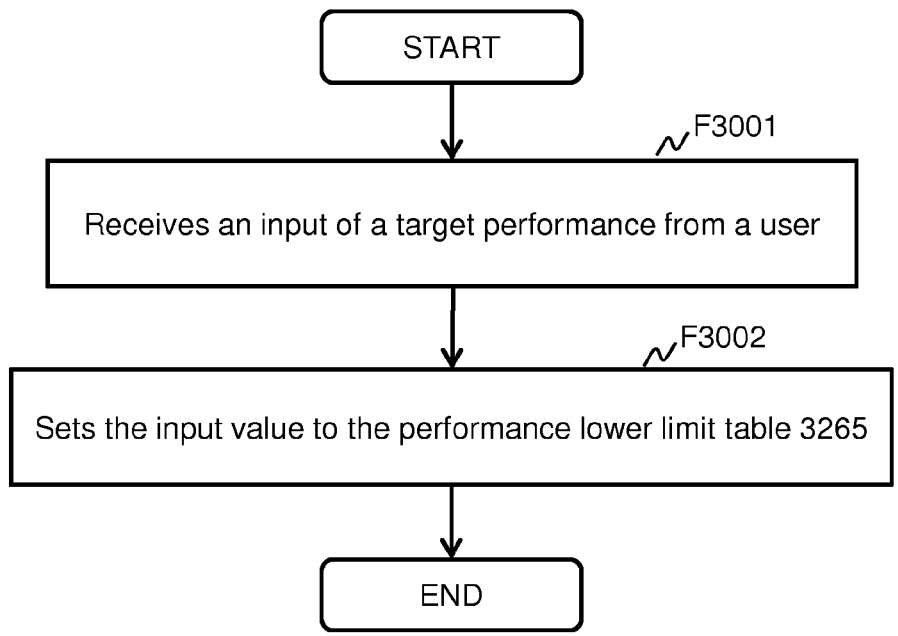
FIG. 33 is a flowchart showing a VDKC lower limit setting processing in accordance with an embodiment 3.

FIG. 33 is a flowchart showing a VDKC lower limit setting processing in accordance with an embodiment 3.

The VDKC lower limit setting processing is a processing for creating and setting, a lower limit that is related to a virtual resource for a VDKC based on a target performance within an SLA (Service Level Agreement) guarantee that has been decided by a user.

The upper limit calculation program 3230 of the external management server. 3000 receives a target performance value for every VOL or in a unit of a storage apparatus from a user (step F3001). In the next place, the storage management program 3210 sets the target performance value that has been received to the performance lower limit table 3265 (step F3002) and terminates the processing.

Figure 34:
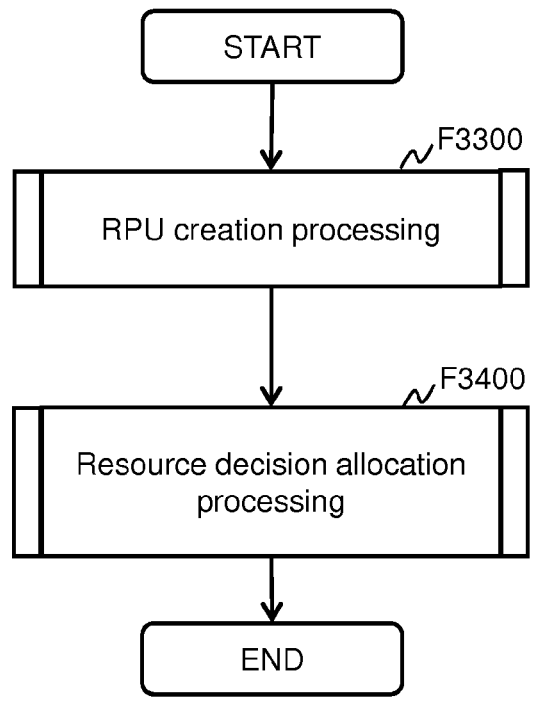
FIG. 34 is a flowchart showing a leveling setting processing in accordance with the embodiment 3.

FIG. 34 is a flowchart showing a leveling setting processing in accordance with the embodiment 3.

The leveling setting processing is executed after a storage apparatus is newly added to a computer system.

The storage management program 3210 executes the RPU creation processing (see FIG. 35) (step F3300). In the RPU creation processing, an RPU is created in the storage apparatus 2000 that has been newly added.

In the next place, the storage management program 3210 executes the resource decision allocation processing for deciding a resource that is allocated to an RPU (step F3400). As the resource decision allocation processing, there are a resource decision allocation processing in which only resource that has been added is a processing target (see FIG. 36) and a resource decision allocation processing in which a resource in existence is also a processing target (see FIG. 37 and FIG. 38).

Figure 35:
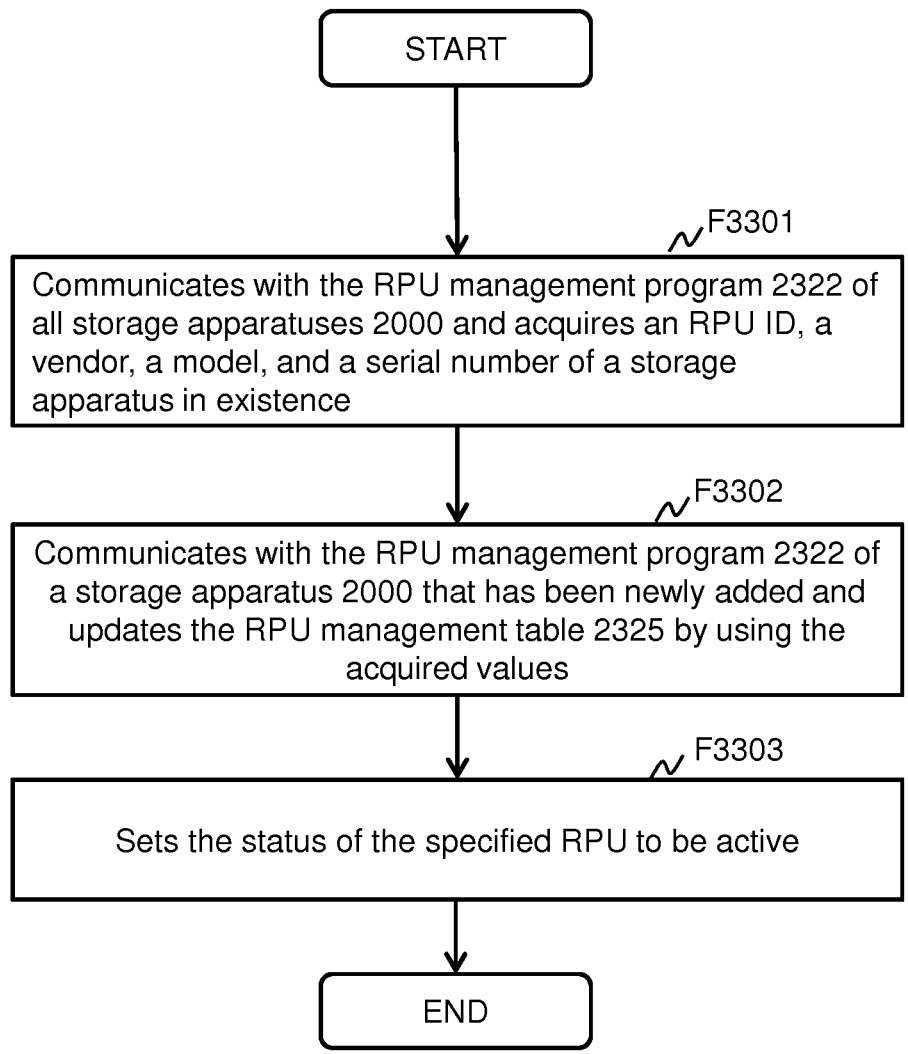
FIG. 35 is a flowchart showing an RPU creation processing in accordance with the embodiment 3.

FIG. 35 is a flowchart showing an RPU creation processing in accordance with the embodiment 3.

The RPU creation processing is corresponded to a processing of the step F3300 of the leveling setting processing of FIG. 34.

The storage management program 3210 communicates with the RPU management program 2322 of all storage apparatuses 2000 and acquires an RPU ID, a vendor, a model, and an S/N of a virtual storage apparatus in existence that have been set to the RPU management table 2325 (step F3301).

In the next place, the storage management program 3210 communicates with the RPU management program 2322 of a storage apparatus 2000 that has been newly added and registers an RPU ID, a vendor, a model, and an S/N that have been acquired in the step F3301 to the RPU management table 2325 (step F3302).

The RPU management program 2322 sets the status field 2325F of an entry that is corresponded to a registered RPU for the RPU management table 2325 to be active (step F3303). After that, the storage management program 3210 terminates the RPU creation processing.

Figure 36:
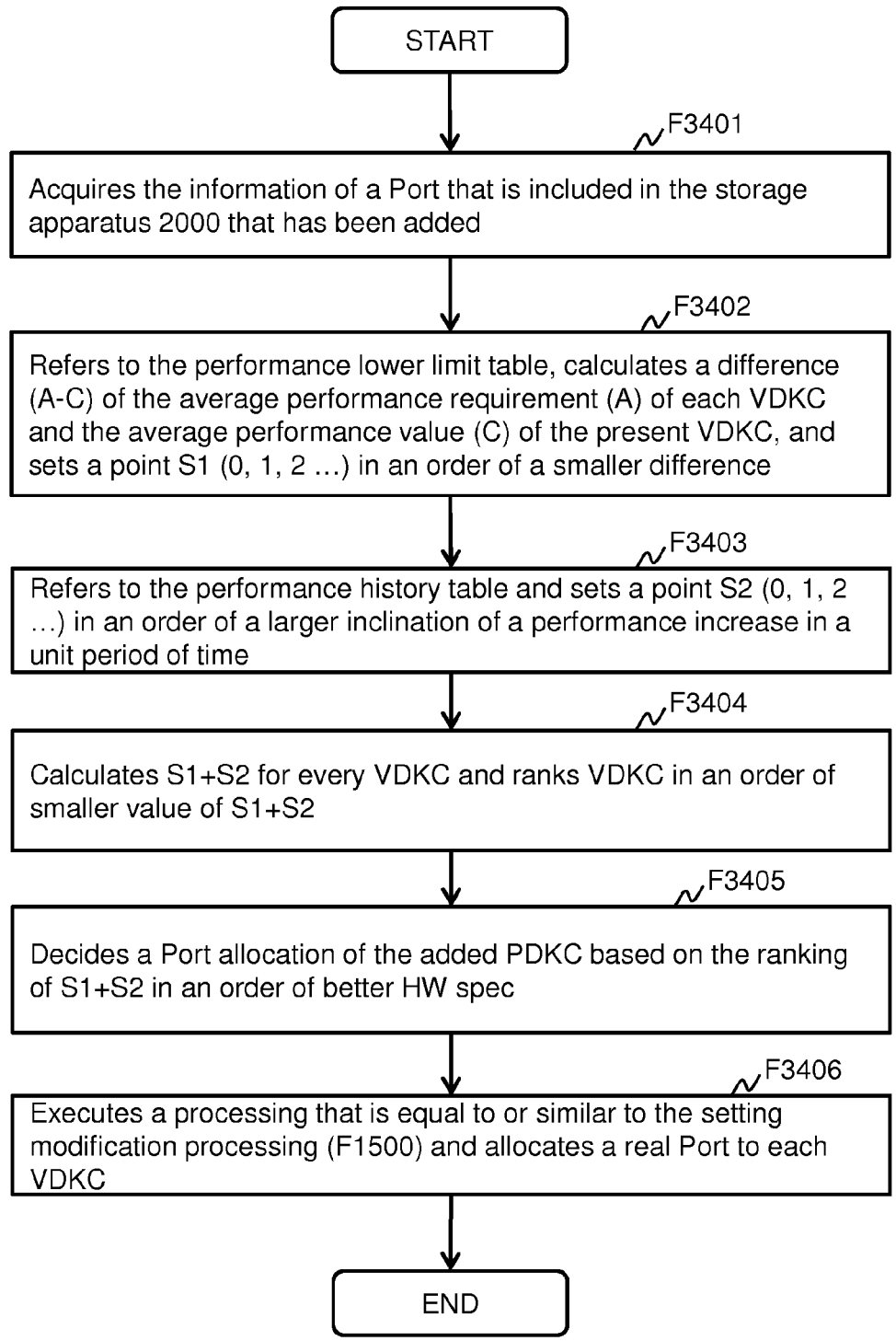
FIG. 36 is a flowchart showing a first example of a resource decision allocation processing in accordance with the embodiment 3.

FIG. 36 is a flowchart showing a first example of a resource decision allocation processing in accordance with the embodiment 3.

The resource decision allocation processing is corresponded to a processing of the step F3400 of the leveling setting processing of FIG. 34 and is a processing in which only a resource of a storage apparatus that has been added is a processing target.

The storage management program 3210 acquires the information of a Port that is included in the storage apparatus 2000 that has been newly added (step F3401). In the next place, the storage management program 3210 calculates an average performance requirement (A) of each VDKC by referring to the performance lower limit table 3265, calculates the present average performance value (C) of a VDKC by referring to the performance history table 3297, calculates a difference (A–C) of the average performance requirement (A) and the average performance value (C), and sets a point S1 (an order of 0, 1, 2 . . . ) to a VDKC in an order of a smaller difference (A–C) (step F3402). In the case in which a difference (A–C) is negative, it is indicated that load exceeds the performance requirement to a VDKC and there is performance margin. On the other hand, in the case in which a difference (A–C) is positive, it is indicated that load does not exceed the performance requirement to a VDKC and there is performance margin. Consequently, by setting a point S1 to a VDKC in an order of a smaller difference (A–C), a less point is set to a VDKC in which a difference (A–C) is smaller, that is, there is not enough performance margin.

In the next place, the storage management program 3210 refers to the performance history table 3297 and sets a point S2 (an order of 0, 1, 2 . . . ) to a VDKC in an order of a larger inclination of a performance increase in a unit period (such as one day) (step F3403). A VDKC that is provided with a larger inclination of a performance increase indicates that there is a high possibility that a performance that will be required hereafter is increased. Consequently, by setting a point S2 to a VDKC in an order of a larger inclination of a performance increase, a less point is set to a VDKC in which the performance has a great possibility of not having enough margin hereafter.

In the next place, the storage management program 3210 calculates S1+S2 for every VDKC and ranks in an order of smaller value of S1+S2 (step F3404). In the case in which a value of S1+S2 is smaller, it is indicated that a VDKC is provided with the performance that does not have enough margin and that has a great possibility of not having enough margin hereafter. Such a VDKC is ranked at first in order.

In the next place, the storage management program 3210 decides a VDKC that is allocated based on the ranking of the step F3404 in an order of better spec of Port hardware for a Port of the added PDKC (step F3405). As a method for deciding an allocation destination, a VDKC can be decided in such a manner that Ports are sorted one by one to each VDKC in an order according to the rank, or a VDKC can be decided in such a manner that Ports are sorted to each VDKC based on a ratio of S1+S2. In the case in which the number of Ports that have been allocated to a VDKC reaches the upper limit of Ports that can be allocated to the VDKC, Ports any more cannot be allocated to the VDKC.

In the next place, the storage management program 3210 allocates a Port to each VDKC by making the RPU management program 2322 execute a processing that is equal to or similar to a processing of the step F1500 of FIG. 21 (step F3406), and terminates the processing. By this processing, a resource of the added storage apparatus can be allocated in an appropriate manner.

Figure 37:
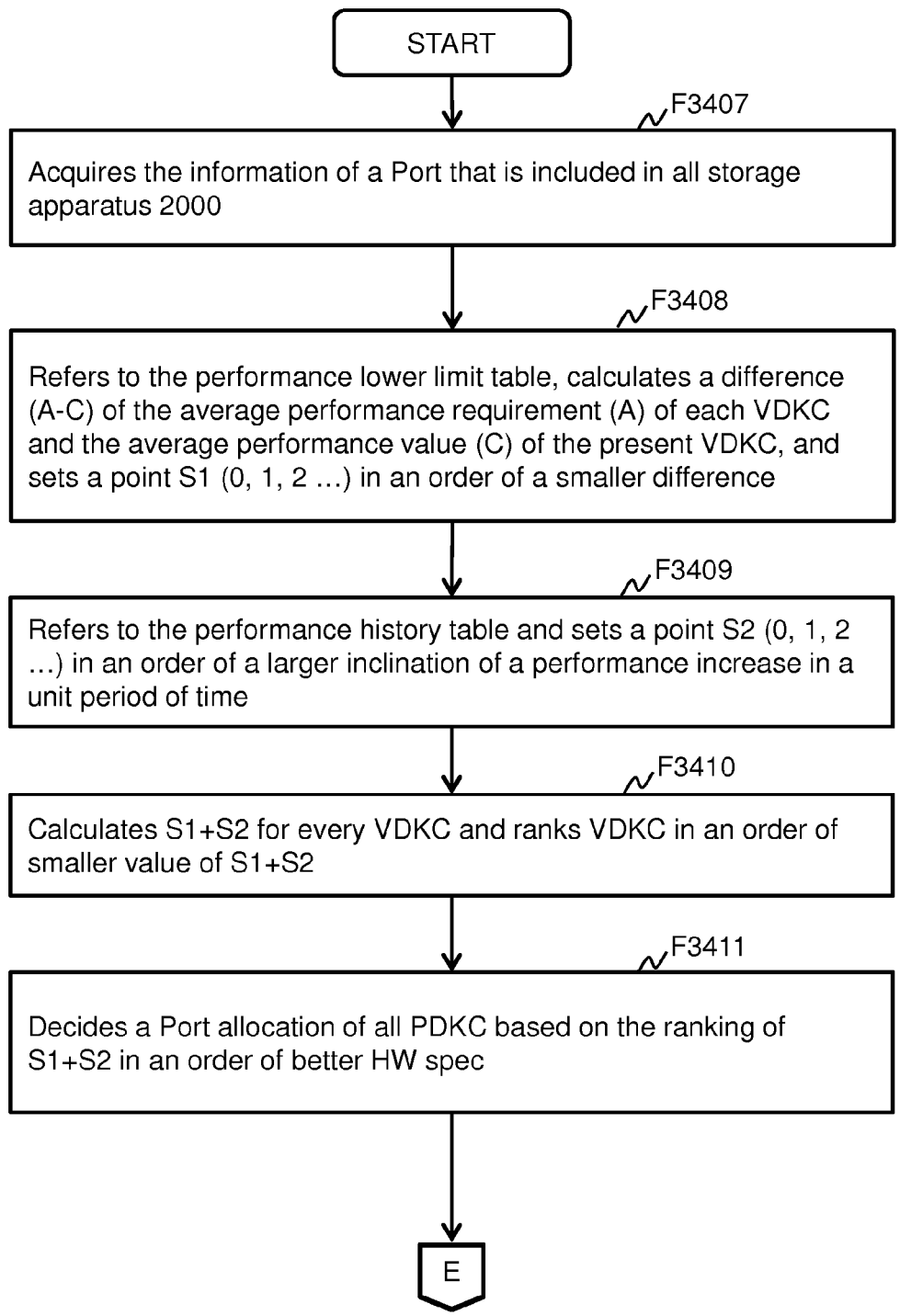
FIG. 37 is a first flowchart showing a second example of a resource decision allocation processing in accordance with the embodiment 3.
Figure 38:
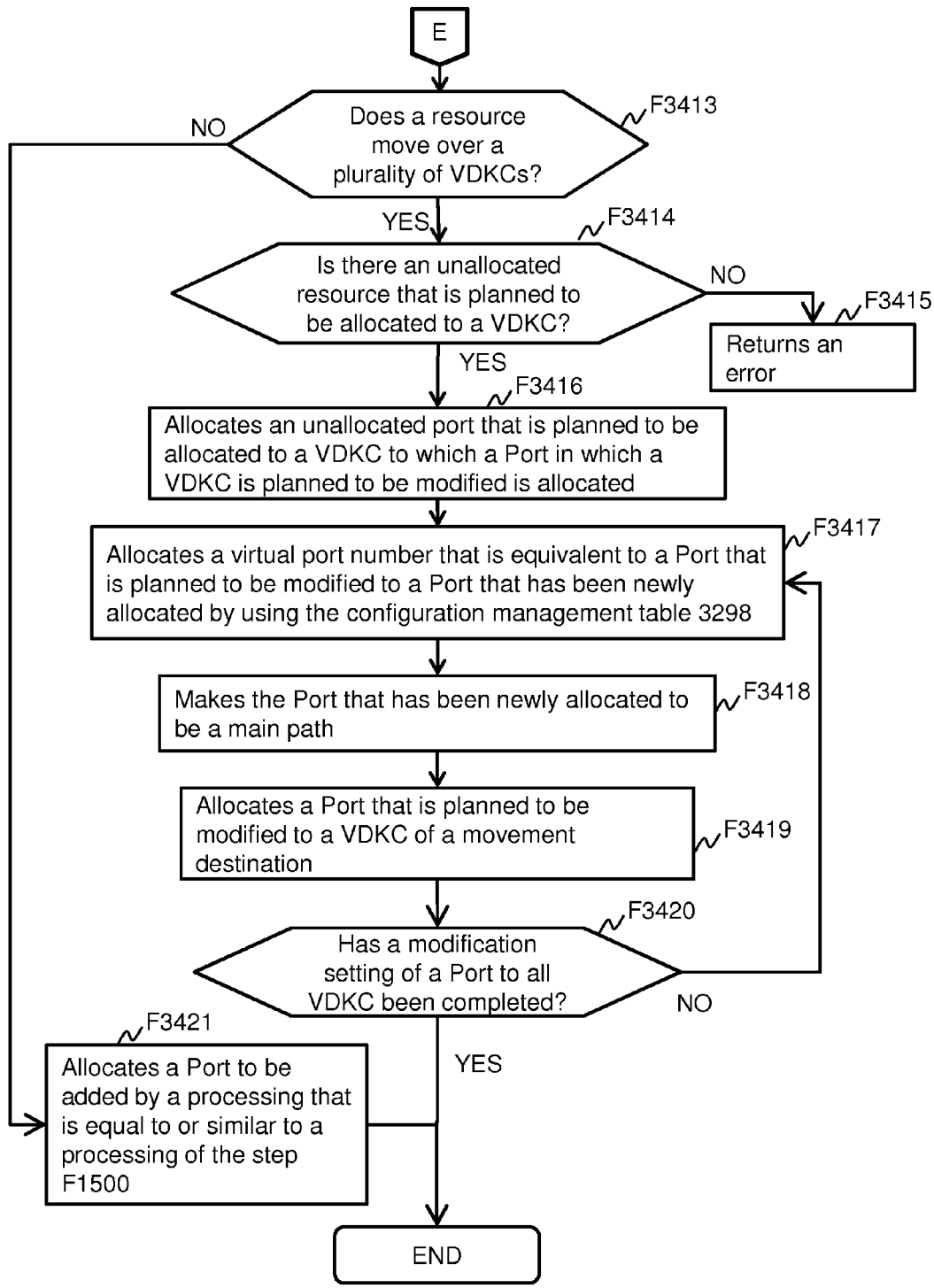
FIG. 38 is a second flowchart showing a second example of a resource decision allocation processing in accordance with the embodiment 3.

FIG. 37 is a first flowchart showing a second example of a resource decision allocation processing in accordance with the embodiment 3. FIG. 38 is a second flowchart showing a second example of a resource decision allocation processing in accordance with the embodiment 3. A symbol E of the flowchart of FIG. 37 and a symbol E of the flowchart of FIG. 38 indicate that the flowcharts are coupled to each other.

The resource decision allocation processing is corresponded to a processing of the step F3400 of the leveling setting processing of FIG. 34 and is a processing in which a resource of all storage apparatuses 2000 is a processing target.

The storage management program 3210 acquires the information of a Port that is included in all storage apparatuses 2000 (step F3407). In the next place, the storage management program 3210 calculates an average performance requirement (A) of each VDKC by referring to the performance lower limit table 3265, calculates the present average performance value (C) of each VDKC by referring to the performance history table 3297, calculates a difference (A–C) of the average performance requirement (A) and the average performance value (C) of each VDKC, and sets a point S1 (an order of 0, 1, 2 . . . ) to a VDKC in an order of a smaller difference (A–C) (step F3408).

In the next place, the storage management program 3210 refers to the performance history table 3297 and sets a point S2 (an order of 0, 1, 2 . . . ) to a VDKC in an order of a larger inclination of a performance increase in a unit period (step F3409).

In the next place, the storage management program 3210 calculates S1+S2 for every VDKC and ranks in an order of smaller value of S1+S2 (step F3410).

In the next place, the storage management program 3210 decides a VDKC that is allocated based on the ranking of the step F3410 in an order of better spec of Port hardware for a Port of the added PDKC (step F3411). As a method for deciding an allocation destination, a VDKC can be decided in such a manner that Ports are sorted one by one to each VDKC in an order according to the rank, or a VDKC can be decided in such a manner that Ports are sorted to each VDKC based on a ratio of S1+S2. In the case in which the number of Ports that have been allocated to a VDKC reaches the upper limit of Ports that can be allocated to the VDKC, Ports any more cannot be allocated to the VDKC.

In the next place, the storage management program 3210 judges whether or not a resource (a Port in this case) moves over a plurality of VDKCs (step F3413).

As a result, in the case in which a resource does not move over a plurality of VDKCs (step F3413: NO), the storage management program 3210 makes the RPU management program 2322 execute a processing that is equal to or similar to a processing of the step F1500, allocates a Port to be added to a VDKC (step F3421), and terminates the processing.

On the other hand, in the case in which a resource moves over a plurality of VDKCs (step F3413: YES), the storage management program 3210 further judges whether or not there is an unallocated resource that is planned to be allocated to a VDKC (step F3414). As a result, in the case in which there is not an unallocated resource that is planned to be allocated to a VDKC (step F3414: NO), the storage management program 3210 returns an error and terminates the processing (step F3415).

On the other hand, in the case in which there is an unallocated resource that is planned to be allocated to a VDKC (step F3414: YES), the storage management program 3210 makes the RPU management program 2322 execute a processing that is equal to or similar to a processing of the step F1500, and allocates an unallocated port that is planned to be allocated to a VDKC to which a Port in which a VDKC is planned to be modified is allocated (step F3416).

In the next place, the storage management program 3210 refers to the configuration management table 3298, and allocates a virtual port number that has been allocated to a Port that is planned to be modified to a Port that has been newly allocated (step F3417).

In the next place, the storage management program 3210 switches a path that has been set to a Port that is planned to be modified to a path of a Port that has been newly allocated, and makes the Port that has been newly allocated to be a main path (step F3418). As described above, since a virtual port number of a Port that is planned to be modified is set to a Port that has been newly allocated, even in the case in which an SCSI Inquiry ID (that includes a virtual apparatus ID, a virtual port number, and a virtual VOL number) for accessing a VOL from the host 1000 has been transmitted, a processing can be executed without any difficulty. Consequently, a Port that is planned to be modified can be allocated to other VDKC without stopping the storage apparatus 2000.

In the next place, the storage management program 3210 allocates a Port that is planned to be modified to a VDKC of a modification destination (step F3419). More specifically for instance, the storage management program 3210 deletes a virtual resource ID of a Port that is planned to be modified (for instance, updates a virtual resource ID of a Port that is planned to be modified to be "null") from the resource ID management table 2326, and then instructs the RPU management program 2322 to set the information of a Port that is planned to be modified to a VDKC of a modification destination similarly to the step F1500.

In the next place, the storage management program 3210 judges whether or not a modification setting of a Port that is planned to be modified to all VDKC has been completed (step F3420). In the case in which a modification setting of a Port that is planned to be modified to all VDKC has not been completed (step F3420: NO), the storage management program 3210 makes the processing proceed to the step F3417. On the other hand, in the case in which a modification setting of a Port that is planned to be modified to all VDKC has been completed (step F3420: YES), the storage management program 3210 terminates the processing. By this configuration, a modification of an allocation of a resource can be executed not only to a resource of an added storage apparatus but also a resource of all storage apparatuses 2000.

A computer system in accordance with the embodiment 4 will be described in the next place.

The computer system in accordance with the embodiment 4 executes a processing of allocating a VOL of an SS (a snapshot) as a resource from a Pool that has already been allocated to an RPU. It is preferable that a VOL of an SS is aggregated to the same storage apparatus 2000. Consequently, for the computer system in accordance with the embodiment 4, a VOL of an SS is allocated in such a manner that a VOL of an SS is aggregated to the same storage apparatus 2000 as much as possible. The configuration of the computer system in accordance with the embodiment 4 is basically equivalent to that of the computer system in accordance with the embodiment 2. In the following, the points that are different from the computer system in accordance with the embodiment 2 will be described mainly.

Figure 39:
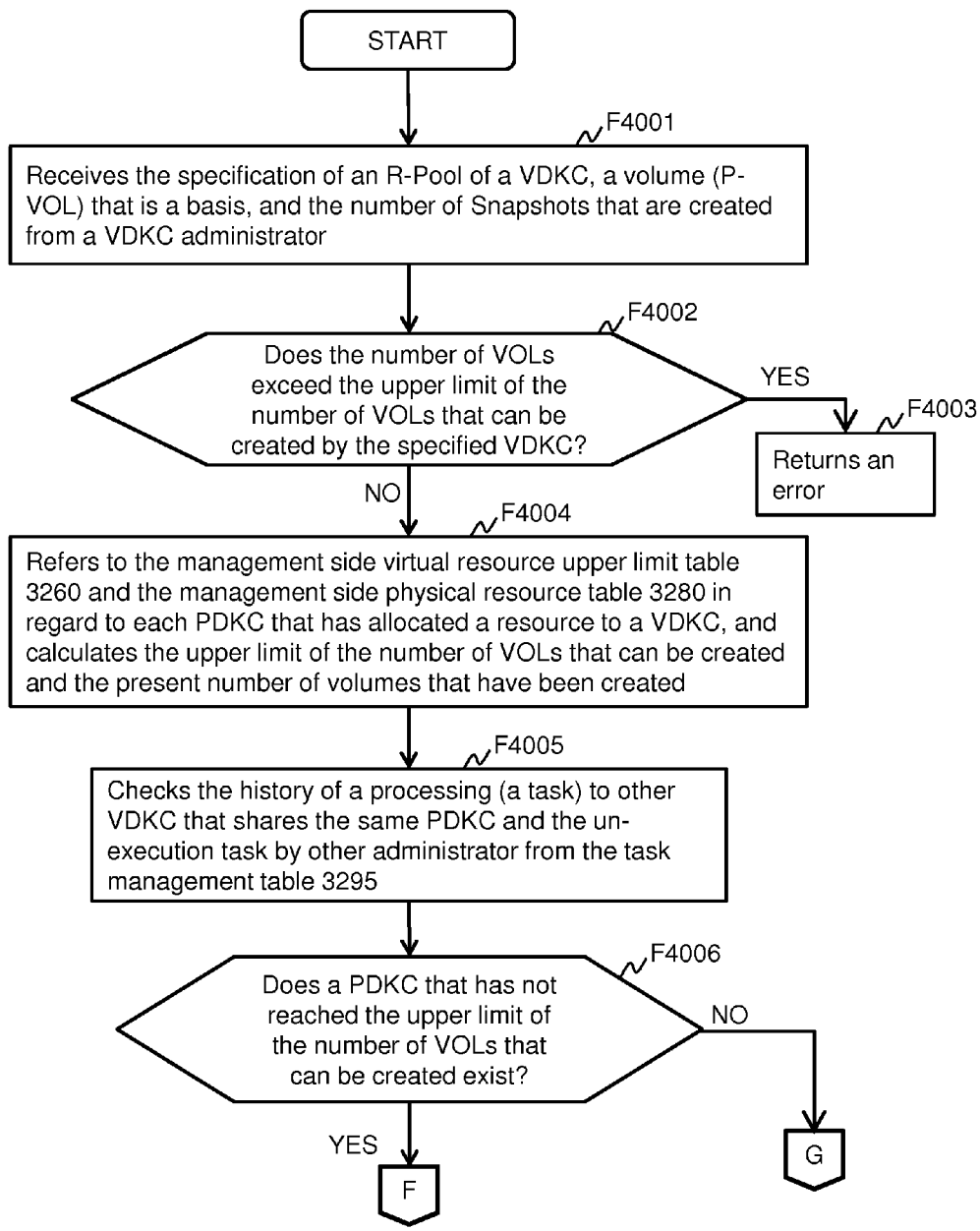
FIG. 39 is a first flowchart showing a modification target selection processing in a resource aggregation in accordance with an embodiment 4.
Figure 40:
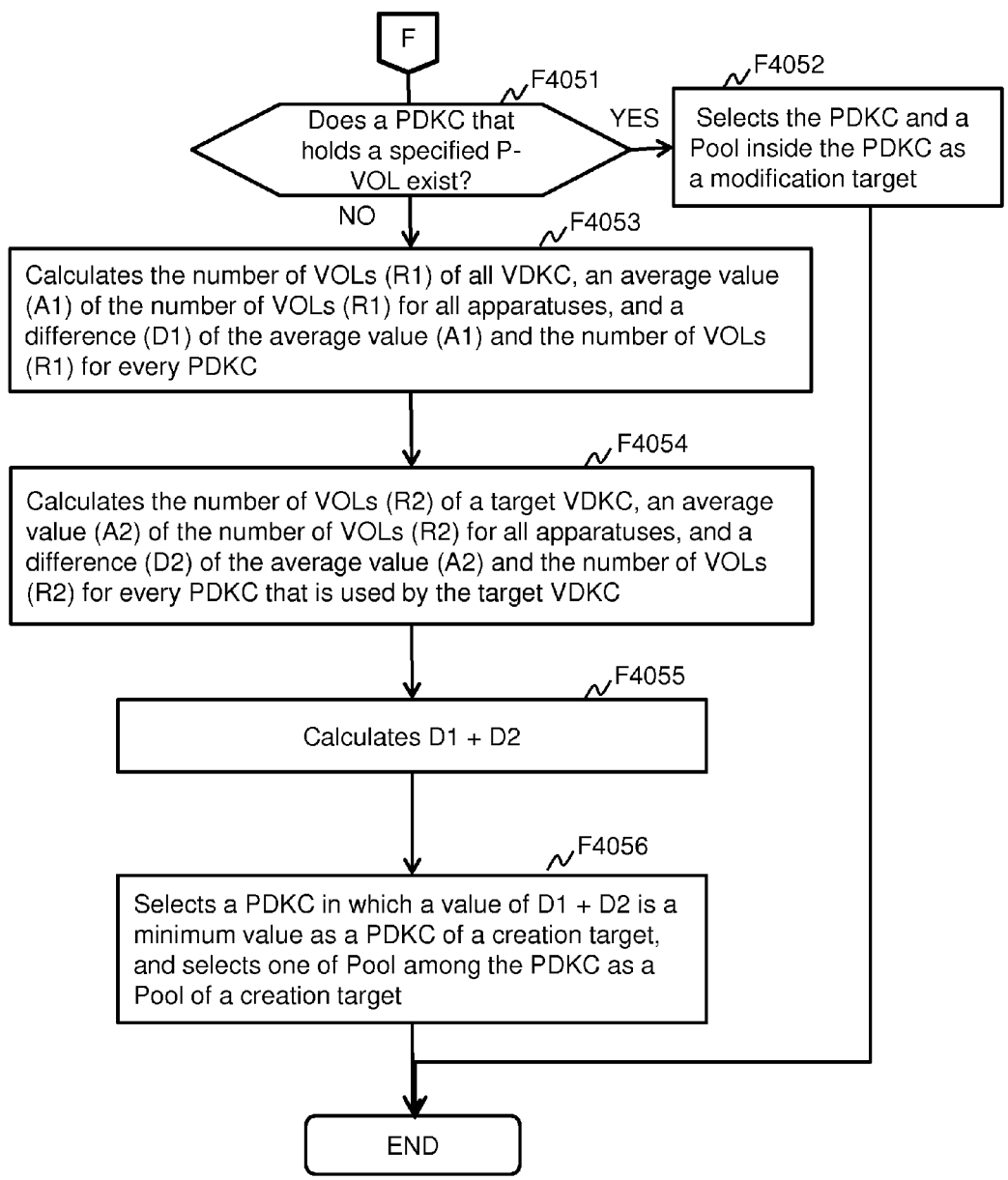
FIG. 40 is a second flowchart showing a modification target selection processing in a resource aggregation in accordance with an embodiment 4.
Figure 41:
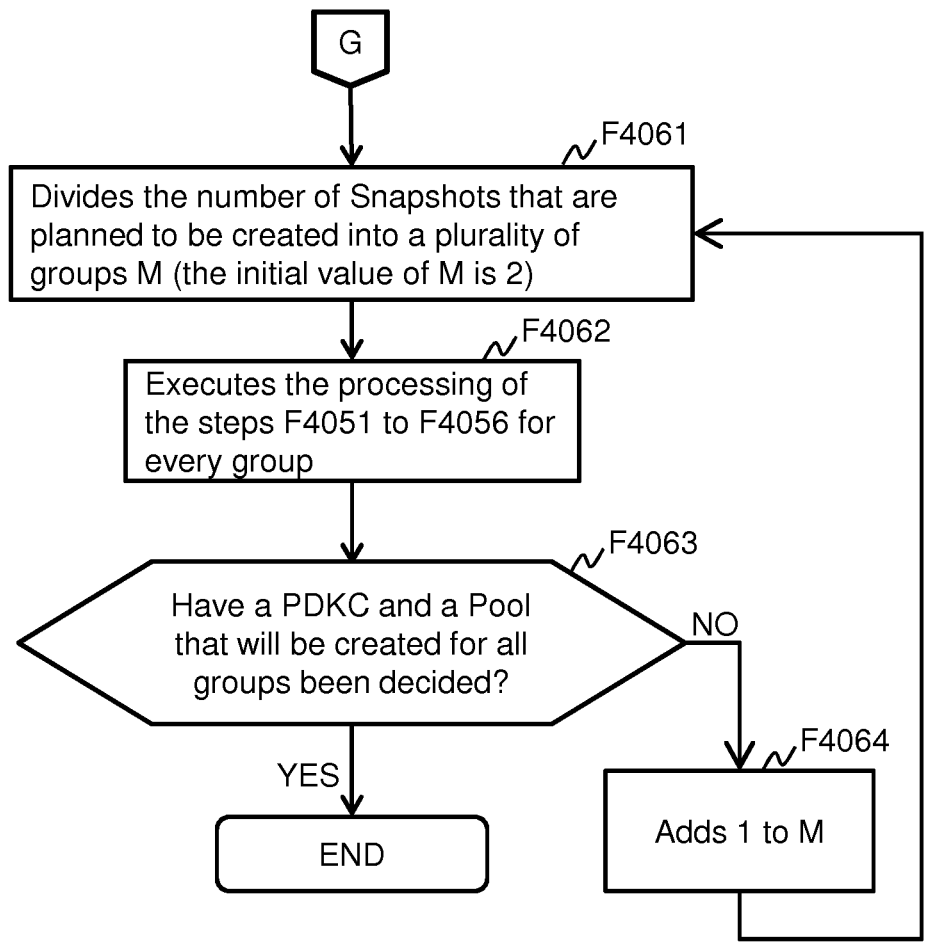
FIG. 41 is a third flowchart showing a modification target selection processing in a resource aggregation in accordance with an embodiment 4.
Figure 42:
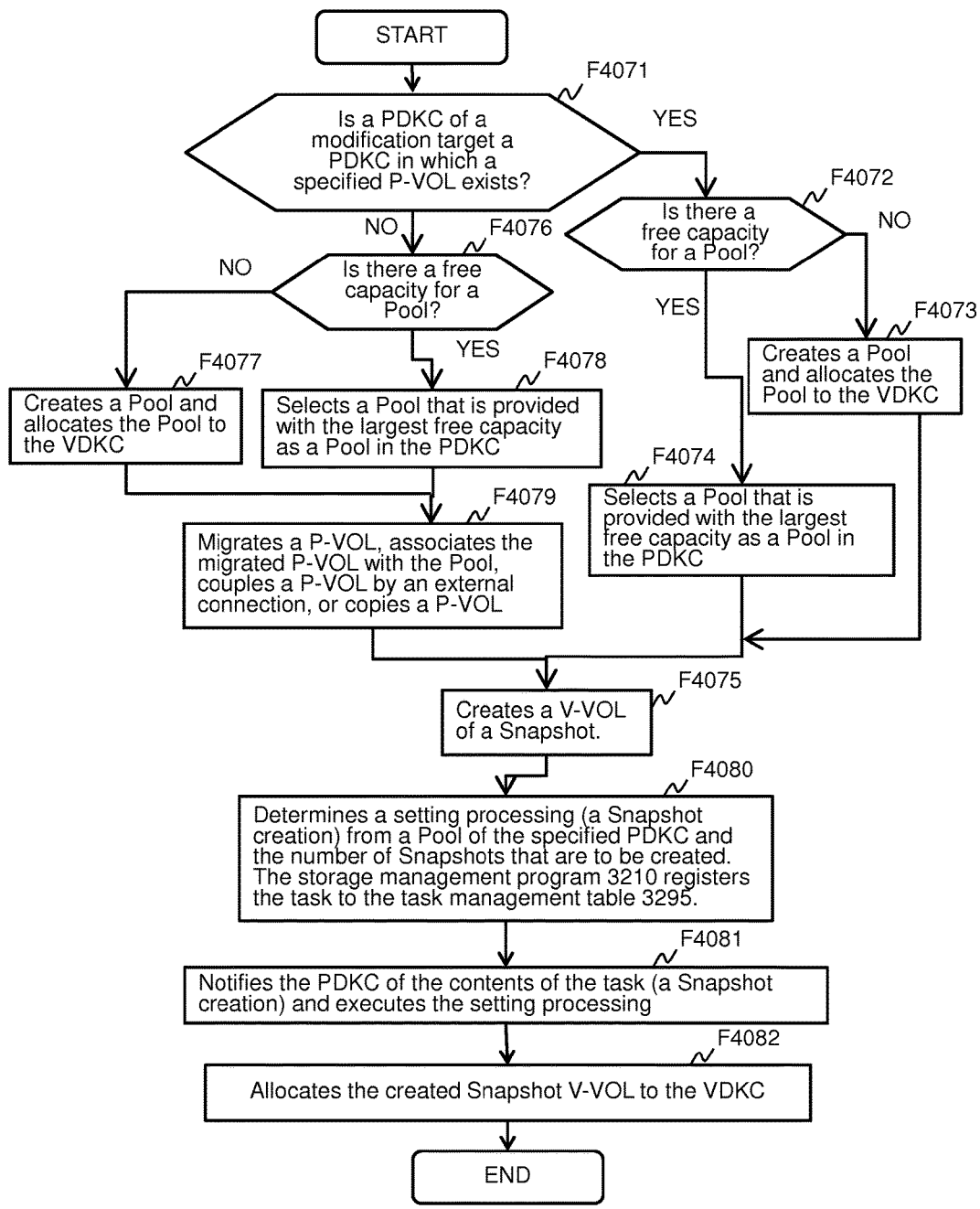
FIG. 42 is a flowchart showing a setting modification processing in accordance with the embodiment 4.

For a resource aggregation setting processing for setting a resource in such a manner that the resources are aggregated for the computer system in accordance with the embodiment 4, a modification target selection processing in a resource aggregation shown in FIG. 39 to FIG. 41 is executed as substitute for a modification target selection processing (the step F2400) and a setting modification processing shown in FIG. 42 is executed as substitute for a configuration modification processing (the step F2500) for a leveling setting processing shown in FIG. 27 in accordance with the embodiment 2.

FIG. 39 is a first flowchart showing a modification target selection processing in a resource aggregation in accordance with an embodiment 4. FIG. 40 is a second flowchart showing a modification target selection processing in a resource aggregation in accordance with an embodiment 4. FIG. 41 is a third flowchart showing a modification target selection processing in a resource aggregation in accordance with an embodiment 4. A symbol F of the flowchart of FIG. 39 and a symbol F of the flowchart of FIG. 40 indicate that the flowcharts are coupled to each other. In addition, a symbol G of the flowchart of FIG. 39 and a symbol G of the flowchart of FIG. 41 indicate that the flowcharts are coupled to each other.

The storage management program 3210 receives the specification of an R-Pool of a VDKC for creating a VOL of an SS, a primary volume (P-VOL) that is a basis of an SS, and the number of SSs that are created from a VDKC administrator (step F4001).

In the next place, the resource allocation decision program 3220 judges whether or not the number of volumes that are corresponded to the number of SSs in which the storage management program 3210 receives the creation instruction exceeds the upper limit of the number of volumes that can be created by the specified VDKC (step F4002). As a result, in the case in which the number of volumes that have been received by the storage management program 3210 exceeds the upper limit of the number of volumes that can be created by the VDKC (step F4002: YES), the resource allocation decision program 3220 returns an error and terminates the processing (step F4003).

On the other hand, in the case in which the number of volumes that have been received by the storage management program 3210 does not exceed the upper limit of the number of volumes that can be created by the VDKC (step F4002:

NO), the resource allocation decision program 3220 refers to the management side virtual resource upper limit table 3250 and the management side physical resource table 3280 in regard to each PDKC that has allocated a resource to a target VDKC, and calculates the upper limit of the number of volumes that can be created and the present number of volumes that have been created (step F4004).

In the next place, the resource allocation decision program 3220 refers to the task management table 3295 and checks the history of a processing (a task) to other VDKC that shares the same PDKC and the un-execution task (step F4005). More specifically, the resource allocation decision program 3220 knows the number of allocated VOLs for a task to other VDKC that shares the same PDKC and the number of VOLs that will be allocated by the un-execution task for each PDKC.

In the next place, the resource allocation decision program 3220 judges whether or not a PDKC that has not reached the upper limit of the number of VOLs that can be created exists in consideration of the number of VOLs that have been allocated by other task and the number of VOLs that will be allocated by other task (step F4006).

As a result, in the case in which such a PDKC does not exist (step F4006: NO), the resource allocation decision program 3220 makes the processing proceed to the step F4061 of FIG. 41.

On the other hand, in the case in which such a PDKC exists (step F4006: YES), the resource allocation decision program 3220 judges whether or not a PDKC that holds a specified P-VOL exists (step F4051).

As a result, in the case in which a PDKC that holds a specified P-VOL exists (step F4051: YES), the resource allocation decision program 3220 selects a Pool inside the PDKC as a modification target for the PDKC (step F4052) and terminates the processing.

On the other hand, in the case in which a PDKC that holds a specified P-VOL does not exist (step F4051: NO), the resource allocation decision program 3220 calculates the number of VOLs (R1) that have been allocated to all VDKC for every PDKC, an average value (A1) of the number of VOLs (R1) for all VDKC, and a difference (D1) of the average value (A1) and the number of VOLs (R1) for every PDKC (step F4053). Here, as D1 is larger, the number of VOLs that have been allocated for the PDKC is smaller. Consequently, in the case in which a PDKC to which a VOL is allocated is selected based on D1, the number of VOLs that are allocated among each PDKC can be leveled.

In the next place, the resource allocation decision program 3220 calculates the number of VOLs (R2) that have been allocated to a target VDKC for every PDKC that has been allocated to the target VDKC, an average value (A2) of the number of VOLs (R2) of a target VDKC for all PDKC, and a difference (D2) of the average value (A2) and the number of VOLs (R2) for every PDKC (step F4054). Here, as D2 is larger, the number of VOLs of a target VDKC for the PDKC is smaller. Consequently, in the case in which a PDKC to which a VOL is allocated is selected based on D2, the number of VOLs for a target VDKC can be leveled.

In the next place, the resource allocation decision program 3220 calculates D1+D2 for every PDKC (step F4055).

In the next place, the resource allocation decision program 3220 selects a PDKC in which a value of D1+D2 is a minimum value as a PDKC of a target for creating a VOL, selects one of Pool among the PDKC as a Pool of a target for creating a VOL (step F4056), and terminates the processing. By this configuration, a Pool of one PDKC that can aggregate and store VOLs of all SSs can be decided.

On the other hand, in the step F4061, the resource allocation decision program 3220 divides the number (N) of SSs that are planned to be created into a plurality (M: the initial value of M is 2) of groups (step F4061). In the next place, the resource allocation decision program 3220 sets each of the groups as a processing target and executes the processing of the steps F4051 to F4056 (step F4062).

In the next place, the resource allocation decision program 3220 judges whether or not a PDKC and a Pool for creating a VOL to all groups that have been divided in the step F4061 have been decided by the processing of the step F4062 (step F4063). In the case in which they have not been decided to all groups (step F4063: NO), the resource allocation decision program 3220 adds 1 to M (step F4064) and makes the processing proceed to the step F4061. On the other hand, in the case in which they have been decided to all groups (step F4063: YES), the resource allocation decision program 3220 terminates the processing.

By the processing of the steps F4061 to F4064, a group of a PDKC and a Pool in which VOLs that are corresponded to an SS can be aggregated to PDKCs of the number as less as possible can be selected.

FIG. 42 is a flowchart showing a setting modification processing in accordance with the embodiment 4.

The storage management program 3210 judges whether or not a PDKC of a modification target that has been selected in the modification target selection processing in a resource aggregation is a PDKC in which a specified P-VOL exists (step F4071).

As a result, in the case in which a PDKC of a modification target is a PDKC in which a specified P-VOL exists (step F4071: YES), the storage management program 3210 judges whether or not there is a free capacity in which a VOL of an SS can be created for a Pool of the PDKC (step F4072).

As a result, in the case in which there is not a free capacity in which a VOL of an SS can be created for a Pool of the PDKC (step F4072: NO), the storage management program 3210 newly creates a Pool to the PDKC, selects the Pool as a Pool for creating a VOL, allocates the Pool to the VDKC (step F4073), and makes the processing proceed to the step F4075. On the other hand, in the case in which there is a free capacity in which a VOL of an SS can be created for a Pool, of the PDKC (step F4072: YES), the storage management program 3210 selects a Pool that is provided with the largest free capacity in the PDKC as a Pool for creating a VOL (step F4074), and makes the processing proceed to the step F4075.

On the other hand, in the case in which a PDKC of a modification target is not a PDKC in which a specified P-VOL exists (step F4071: NO), the storage management program 3210 judges whether or not the Pool of the PDKC is provided with a free capacity for creating a VOL of an SS (step F4076).

As a result, in the case in which the Pool of the PDKC is not provided with a free capacity for creating a VOL of an SS (step F4076: NO), the storage management program 3210 newly creates a Pool to the PDKC, selects the Pool as a Pool for creating a VOL, allocates the Pool to the VDKC (step F4077), and makes the processing proceed to the step F4079. On the other hand, in the case in which the Pool of the PDKC is provided with a free capacity for creating a VOL of an SS (step F4076: YES), the storage management program 3210 selects a Pool that is provided with the largest free capacity in the PDKC as a Pool for creating a VOL (step F4078), and makes the processing proceed to the step F4079.

In the step F4079, the storage management program 3210 executes any one of the processing of (a) migrating a P-VOL to the PDKC and associating the migrated P-VOL with the selected Pool, (b) coupling a P-VOL to the PDKC by an external connection and associating the P-VOL with the selected Pool, and (c) copying a P-VOL to the PDKC and associating the P-VOL with the selected Pool. By executing any one of the processing of (a), (b), and (c), a V-VOL of an SS can be created by the PDKC of the modification target. After that, the storage management program 3210 makes the processing proceed to the step F4075.

In the step F4075, the storage management program 3210 creates a virtual VOL (V-VOL) of an SS.

In the next place, the storage management program 3210 determines a setting processing (an SS creation) from a Pool of the selected PDKC and the number of SSs that are to be created, and registers a task that is corresponded to the setting processing to the task management table 3295 (step F4080). In the next place, the storage management program 3210 notifies the target PDKC for creating a VOL of the contents of the task, and makes the setting processing that is corresponded to the task be executed (step F4081). In the next place, the storage management program 3210 allocates a virtual VOL (V-VOL) of the created SS to the VDKC (step F4082), and terminates the processing. By this configuration, the V-VOLs of the SSs of the specified number are created to the selected Pool for the PDKC.

A computer system in accordance with the embodiment 5 will be described in the next place.

The computer system in accordance with the embodiment 5 executes a processing of an allocation of a resource in the case of a new license is added and a new VDKC is added for the computer system. The configuration of the computer system in accordance with the embodiment 5 is basically equivalent to that of the computer system in accordance with the embodiment 1. In the following, the points that are different from the computer system in accordance with the embodiment 1 will be described mainly.

Figure 43:
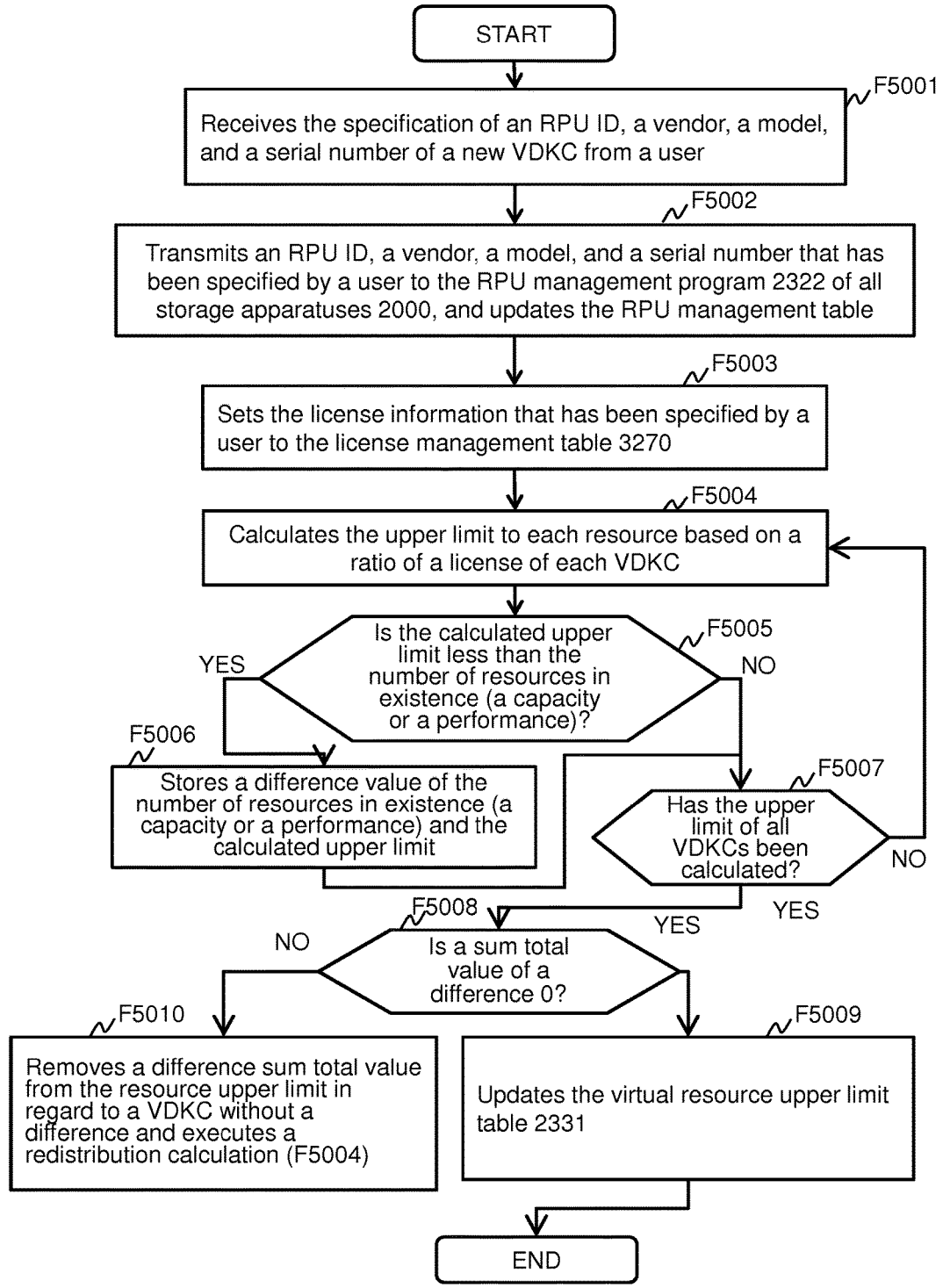
FIG. 43 is a flowchart showing a VDKC upper limit setting processing in accordance with an embodiment 5.

FIG. 43 is a flowchart showing a VDKC upper limit setting processing in accordance with an embodiment 5.

The storage management program 3210 receives the specification of an RPU ID, a vendor, a model, a serial number, and the license information of a VDKC that is newly added from a VDKC administrator or a DKCPOOL administrator (step F5001).

In the next place, the storage management program 3210 transmits an RPU ID, a vendor, a model, and a serial number that have been specified to the RPU management program 2322 of all storage apparatuses 2000, and updates the RPU management table 2325 based on the information (step F5002). In the next place, the upper limit calculation program 3320 sets the specified license information to the license management table 3270 (step F5003).

In the next place, the upper limit calculation program 3230 calculates the upper limit of each VDKC for each PDKC to each resource based on a ratio of a license fee of each VDKC (step F5004).

In the next place, the upper limit calculation program 3230 judges whether or not the calculated upper limit is less than the number of resources in existence (or a capacity, or a performance) (step F5005). As a result, in the case in which the calculated upper limit is less than the number of resources in existence (step F5005: YES), the upper limit calculation program 3230 stores a difference value of the number of resources in existence (or a capacity, or a performance) and the calculated upper limit (step F5006), and makes the processing proceed to the step F5007. On the other hand, in the case in which the calculated upper limit is not less than the number of resources in existence (step F5005: NO), the upper limit calculation program 3230 makes the processing proceed to the step F5007.

In the step F5007, the upper limit calculation program 3230 judges whether or not the upper limit to a resource of all VDKCs has been calculated. As a result, in the case in which the upper limit to a resource of all VDKCs has not been calculated (step. F5007: NO), the upper limit calculation program 3230 makes the processing proceed to the step F5004 and executes the processing while a VDKC that has not been processed is set to a processing target. On the other hand, in the case in which the upper limit to a resource of all VDKCs has been calculated (step F5007: YES), the upper limit calculation program 3230 makes the processing proceed to the step F5008.

In the step F5008, the upper limit calculation program 3230 judges whether or not a sum total value of a difference (a difference sum total value) is 0. As a result, in the case in which a difference sum total value is not 0 (step F5008: NO), the storage management program 3210 executes a calculation for removing a difference sum total value from the resource upper limit in regard to a VDKC without a difference (a VDKC in which the number (amount) of allocated resources in existence is not less than the upper limit of a new distribution that is planned) and then for executing a redistribution (a processing from the step F5004) (step F5010). More specifically for instance, the upper limit calculation program 3230 subtracts a sum total (B) of the number of resources that have been allocated to at least one VDKC with a difference from a sum total (A) of the resource upper limit (the virtual resource upper limit) for a wide variety of resource upper limits, and executes a redistribution calculation in accordance with a license ration of a VDKC without a difference and a VDKC that is added in regard to a value (A−B) after the operation of subtraction. The value (A−B) after the operation of subtraction is the resource upper limit that can be distributed. Moreover, in the case in which a difference does not vanish away until the number of VDKC becomes 1, an error can be issued. In other words, in the case in which the number of resources that have been allocated exceeds the upper limit in the case in which the upper limit is allocated by the new standard, the upper limit of the VDKC is not modified, and a redistribution is executed by a value that is obtained by removing a resource of the VDKC that exceeds the upper limit among the remaining VDKC.

On the other hand, in the case in which a difference sum total value is 0 (step F5008: YES), the storage management program 3210 communicates with the storage control program 2321, updates the virtual resource upper limit table 2331 (step F5009), and terminates the processing.

As described above, based on the computer system in accordance with the embodiment 5, in the case in which a new license is added and a new VDKC is added, a resource can be allocated in an appropriate manner.

While the preferred embodiments in accordance with the present invention have been described above, it comes near to stating the obvious that the present invention is not restricted to the embodiments, and various changes, modifications, and functional additions can be thus made without departing from the scope of the present invention. For instance, a computer system can also be configured by combining computer systems in accordance with at least two embodiments among the embodiments 1 to 5. Moreover for instance, a real resource and a real storage apparatus can also be referred to as a physical resource and a physical storage apparatus, respectively.

REFERENCE SIGNS LIST

1000: Host computer
2000: Storage apparatus
3000: External management server

The invention claimed is:
1. A computer system comprising:
a storage system that is configured by a plurality of real storage apparatuses that are each respectively provided with a plurality of real resources and a plurality of real ports, and at least one of the real storage apparatuses is configured to supply a real logical unit that is a logical storage device from the real resources thereof; and
a management system that is coupled to the storage system,
wherein the management system includes a processor which is programmed to:
allocate virtual resources based on the real resources as tenant resources usable by a tenant from the real storage apparatuses to the tenant based on first information that includes an upper limit that is related to a number of the real resources of each of the real storage apparatuses and second information that is an upper limit that is related to the real resources that are a basis of the tenant resources, and
allocate virtual ports to a virtual storage apparatus usable by the tenant and provided with the tenant resources based on the real resources that are the basis of the tenant resources and the real ports of the real storage apparatuses, and allocate the real ports that are a basis of the virtual ports that are usable by the tenant based on the first information and the second information when the virtual ports are allocated,
wherein the real resources that are the basis of the tenant resources are distributed among the storage apparatuses,
wherein the virtual storage apparatus is provided with a virtual logical unit to which the real logical unit in the at least one of the real storage apparatuses that is a basis of the virtual storage apparatus has been allocated, and
wherein the virtual ports are allocated to the tenant based on a rate of the number of real ports that are the basis of the virtual ports and a number of real logical units that are handled by the real ports and that have been allocated to the virtual storage apparatus.
2. The computer system according to claim 1,
wherein the virtual logical unit is a tenant resource usable by the tenant, and
wherein the upper limit that is related to the real resources is a capacity of a real logical unit that can be allocated based on at least one of the first information and the second information.
3. The computer system according to claim 2,
wherein the processor is further programmed to:
allocate the real logical unit that is a basis of the virtual logical unit usable by the tenant to the tenant based on the first information and the second information when the virtual logical unit usable by the tenant is allocated to the virtual storage apparatus.
4. The computer system according to claim 1,
wherein at least one of the tenant resources is aggregated to one of the storage apparatuses.

5. The computer system according to claim 1,
wherein the processor is further programmed to:
allocate the virtual resources based on the real resources as the tenant resources from the real storage apparatuses to the tenant based on the first information and the second information when an additional real storage apparatus is added to the storage system.
6. The computer system according to claim 1,
wherein the second information is an upper limit for a performance value of the tenant resources that are allocated to the tenant.
7. The computer system according to claim 1,
wherein the processor is further programmed to:
allocate the virtual resources based on the real resources as the tenant resources from the real storage apparatuses to the tenant or a new tenant based on the first information and the second information when an additional real storage apparatus usable by the tenant is added or an additional tenant resource usable by the new tenant is added.
8. A computer system comprising:
a storage system that is configured by a plurality of real storage apparatuses that are each respectively provided with a plurality of real resources; and
a management system that is coupled to the storage system,
wherein the management system includes a processor which is programmed to:
allocate the real resources or virtual resources based on the real resources as tenant resources from the at least one real storage apparatus to a tenant based on first information that includes an upper limit that is related to the real resources of each of the real storage apparatuses and second information that is an upper limit that is related to the real resources that are allocated as the tenant resources usable by the tenant or as the real resources that are a basis of the tenant resources,
wherein at least one of the tenant resources that has been allocated to the tenant or the real resources that are the basis for one of the tenant resources are aggregated to one of the storage apparatuses,
wherein the real storage apparatuses are respectively configured to supply a real logical unit that is a logical storage device,
wherein a virtual storage apparatus based on the real storage apparatuses is provided with a virtual logical unit to which the real logical units that are included in one or more of the real storage apparatuses that are a basis of the virtual storage apparatus has been allocated,
wherein the virtual logical unit for a snapshot is provided the tenant resource, and
wherein the processor is further programmed to:
allocate the real logical unit that is a basis of the virtual logical unit for the snapshot usable by the tenant to the tenant based on the first information and the second information when the virtual logical unit for the snapshot usable by the tenant is allocated.
9. A resource management method comprising:
providing a storage system that is configured by a plurality of real storage apparatuses that are each respectively provided with a plurality of real resources and a plurality of real ports, and at least one of the real storage apparatuses is configured to supply a real logical unit that is a logical storage device from the real resources thereof, and a management system coupled to the storage system;

allocating virtual resources based on the real resources as tenant resources usable by a tenant from the real storage apparatuses to the tenant based on referring to first information that includes an upper limit that is related to a number of the real resources of each of the real storage apparatuses and second information that is an upper limit that is related to the real resources that are a basis of the tenant resources; and allocating virtual ports to a virtual storage apparatus usable by the tenant and provided with the tenant resources based on the real resources that are the basis of the tenant resources and the real ports of the real storage apparatuses, and allocate the real ports that are a basis of the virtual ports that are usable by the tenant based on the first information and the second information when the virtual ports are allocated, wherein the real resources that are the basis of the tenant resources are distributed among the storage apparatuses, wherein the virtual storage apparatus is provided with a virtual logical unit to which the real logical unit in the at least one of the real storage apparatuses that is a basis of the virtual storage apparatus has been allocated, and wherein the virtual ports are allocated to the tenant based on a rate of the number of real ports that are the basis of the virtual ports and a number of real logical units that are handled by the real ports and that have been allocated to the virtual storage apparatus.

\* \* \* \* \*